United States Patent
Ujiie et al.

(10) Patent No.: US 11,842,185 B2
(45) Date of Patent: *Dec. 12, 2023

(54) GATEWAY DEVICE, IN-VEHICLE NETWORK SYSTEM, AND FIRMWARE UPDATE METHOD

(71) Applicant: PANASONIC INTELLECTUAL PROPERTY CORPORATION OF AMERICA, Torrance, CA (US)

(72) Inventors: Yoshihiro Ujiie, Tokyo (JP); Hideki Matsushima, Tokyo (JP); Jun Anzai, Kanagawa (JP); Toshihisa Nakano, Osaka (JP); Tomoyuki Haga, Nara (JP); Manabu Maeda, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,185

(22) Filed: Jan. 10, 2023

(65) Prior Publication Data

US 2023/0153099 A1     May 18, 2023

Related U.S. Application Data

(63) Continuation of application No. 16/902,780, filed on Jun. 16, 2020, now Pat. No. 11,599,349, which is a
(Continued)

(30) Foreign Application Priority Data

May 31, 2016    (JP) ................................. 2016-109585

(51) Int. Cl.
*G06F 8/65*      (2018.01)
*G06F 8/654*     (2018.01)
(Continued)

(52) U.S. Cl.
CPC ................ *G06F 8/65* (2013.01); *B60R 16/02* (2013.01); *B60R 16/023* (2013.01); *G06F 8/654* (2018.02);
(Continued)

(58) Field of Classification Search
None
See application file for complete search history.

(56) References Cited

U.S. PATENT DOCUMENTS 9,547,487 B2    1/2017   Adachi
9,916,151 B2    3/2018   Ye et al.
(Continued)

FOREIGN PATENT DOCUMENTS

JP    2004-038766 A    2/2004
JP    2006-164030 A    6/2006
(Continued)

OTHER PUBLICATIONS

Extended European Search Report, dated Oct. 2, 2018, from the European Patent Office (EPO) for the related European Patent Application No. 16845860.2.
(Continued)

*Primary Examiner* — Eric C Wai
(74) *Attorney, Agent, or Firm* — Greenblum & Bernstein, P.L.C.

(57) ABSTRACT

A gateway device is connected via network(s) to electronic controllers on-board a vehicle, where at least one of the electronic controllers is implemented in a virtual machine. The gateway device includes one or more memories, and circuitry that acquires firmware update information. The circuitry determines whether a first electronic controller satisfies a second condition based on second information, which is whether the first electronic controller includes a firmware cache for performing a pre-update firmware cache
(Continued)

operation. The circuitry also causes, when the second condition is not satisfied, the gateway device to execute a proxy process, where the gateway device requests the first electronic controller to transmit boot ROM data to the gateway device, creates updated boot ROM data with the updated firmware, and transmits the updated boot ROM data to the first electronic controller that updates the boot ROM and resets the first electronic controller with the updated firmware.

13 Claims, 22 Drawing Sheets

Related U.S. Application Data continuation of application No. 15/465,653, filed on Mar. 22, 2017, now Pat. No. 10,725,762, which is a continuation of application No. PCT/JP2016/003081, filed on Jun. 27, 2016.

(60) Provisional application No. 62/218,111, filed on Sep. 14, 2015.

(51) Int. Cl.

| | | |
|---|---|---|
| *B60R 16/02* | (2006.01) | |
| *B60R 16/023* | (2006.01) | |
| *G06F 11/00* | (2006.01) | |
| *G06F 11/14* | (2006.01) | |
| *H04L 12/40* | (2006.01) | |
| *H04L 12/46* | (2006.01) | |
| *H04W 4/48* | (2018.01) | |
| *G06F 21/04* | (2006.01) | |
| *H04L 67/12* | (2022.01) | |
| *H04L 67/00* | (2022.01) | |
| *G06F 21/64* | (2013.01) | |

(52) U.S. Cl.
CPC .......... *G06F 11/00* (2013.01); *G06F 11/1433* (2013.01); *H04L 12/40006* (2013.01); *H04L 12/4625* (2013.01); *G06F 21/64* (2013.01); *H04L 67/12* (2013.01); *H04L 67/34* (2013.01); *H04W 4/48* (2018.02)

(56) References Cited

U.S. PATENT DOCUMENTS

| | | | |
|---|---|---|---|
| 10,206,114 | B2 | 2/2019 | Choi et al. |
| 2004/0006703 | A1 | 1/2004 | Kitani et al. |
| 2004/0039500 | A1 | 2/2004 | Amendola et al. |
| 2015/0154014 | A1 | 6/2015 | Adachi |
| 2016/0224806 | A1 | 8/2016 | Takada et al. |
| 2016/0366229 | A1 | 12/2016 | Yamaura et al. |
| 2017/0060559 | A1 | 3/2017 | Ye et al. |
| 2017/0192770 | A1 | 7/2017 | Ujiie et al. |
| 2018/0354581 | A1* | 12/2018 | Meermann ............. B62J 45/414 |

FOREIGN PATENT DOCUMENTS

| | | | |
|---|---|---|---|
| JP | 2010-273181 | A | 12/2010 |
| JP | 2015-058896 | A | 3/2015 |
| JP | 2015-103163 | A | 6/2015 |
| JP | 2017-059211 | A | 3/2017 |
| JP | 6675271 | B2 | 4/2020 |

OTHER PUBLICATIONS

International Search Report, dated Sep. 13, 2016, in International Application No. PCT/JP2016/003081.

* cited by examiner

FIG. 4

| RECEIVED ID LIST |
|---|
| 1 |
| 2 |
| 3 |
| 4 |

FIG. 5

| FORWARDING SOURCE | FORWARDING DESTINATION | ID |
|---|---|---|
| 200a | 200b | * |
| 200b | 200a | 3 |

FIG. 6

| ECU-ID | ECU TYPE | MANUFACTURING COMPANY | SIGNATURE VERIFICATION FUNCTION | FW CACHE |
|---|---|---|---|---|
| 0001 | ENGINE | A CORP. | Y | Y |
| 0002 | BRAKE | B CORP. | Y | N |
| 0003 | DOOR | C CORP. | N | Y |
| 0004 | WINDOW | D CORP. | N | N |

FIG. 12

| VEHICLE ID | ECU-ID | ECU TYPE | MANUFACTURING COMPANY | SIGNATURE VERIFICATION FUNCTION | FW CACHE | FW VERSION | LATEST FW VERSION |
|---|---|---|---|---|---|---|---|
| VEHICLE A | 0001 | ENGINE | A CORP. | Y | Y | 1.0 | 1.0 |
| VEHICLE A | 0002 | BRAKE | B CORP. | Y | N | 1.0 | 1.0 |
| VEHICLE A | 0003 | DOOR | C CORP. | N | Y | 1.0 | 1.0 |
| VEHICLE A | 0004 | WINDOW | D CORP. | N | N | 1.0 | 2.0 |

GATEWAY DEVICE, IN-VEHICLE NETWORK SYSTEM, AND FIRMWARE UPDATE METHOD

CROSS REFERENCE TO RELATED APPLICATION

This application is a continuation of U.S. patent application Ser. No. 16/902,780, filed Jun. 16, 2020, which is a continuation of U.S. patent application Ser. No. 15/465,653, filed Mar. 22, 2017 and now U.S. Pat. No. 10,725,762 issued Jul. 28, 2020, which is a continuation of International Patent Application No. PCT/JP2016/003081, filed Jun. 27, 2016, which claims the benefit of U.S. Provisional Patent Application No. 62/218,111, filed Sep. 14, 2015, and priority from Japanese Patent Application No. 2016-109585, filed May 31, 2016. The disclosure of each of the above-mentioned documents, including the specification, drawings, and claims, is incorporated herein by reference in its entirety.

BACKGROUND

1. Technical Field

The present disclosure relates to technology that updates firmware in an electronic control unit that communicates on an in-vehicle network.

2. Description of the Related Art

Recently, in systems inside automobiles, devices called electronic control units (ECUs) are being disposed in large numbers. A network joining these ECUs is called an in-vehicle network. Various standards exist for in-vehicle networks. One of the most prevalent in-vehicle network standards is called a controller area network (CAN) prescribed in ISO 11898-1.

In CAN, each communication path (bus) is constituted by two cables (lines), and ECUs connected to the bus are referred to as nodes. Each node connected to a bus transmits and receives a message called a frame. A transmitting node that is to transmit a frame applies a voltage to two cables to generate a potential difference between the cables, thereby transmitting the value "1" called recessive and the value "0" called dominant. When multiple transmitting nodes transmit recessive and dominant at the exact same timing, the dominant is prioritized for transmission. When there is an abnormality in the format of a received frame, the receiving node transmits a frame called an error frame. In an error frame, dominant is transmitted for 6 bits in succession, thereby notifying the transmitting node and other receiving nodes of the abnormality in the frame.

In addition, in a CAN, identifiers that indicate the destination and the source of a transmission do not exist, and instead, the transmitting node transmits (in other words, sends out signals on the buses) while attaching an ID called a message ID to each frame, while each receiving node receives (in other words, reads signals from the buses) only frames with a predetermined ID. Also, carrier sense multiple access with collision avoidance (CSMA/CA) is adopted, whereby mediation according to message ID is conducted when multiple nodes transmit simultaneously, and the frame whose message ID has the smaller value is prioritized for transmission.

When many ECUs are operating in conjunction with each other by exchanging messages via buses, if an ECU starts updating its firmware (FW), there is a possibility of affecting the running of the automobile, due to factors such as the ECU being unable to exchange messages during the update. Regarding this point, there is known a technology that updates firmware only in a case of determining, from information indicating the state of the automobile, that the firmware of the ECU may be updated, such as while the automobile is stopped (see Japanese Unexamined Patent Application Publication No. 2010-273181, for example).

SUMMARY

However, the technology of the related art requires further improvement.

In one general aspect, the techniques disclosed here feature a gateway device connected via one or more buses to a plurality of electronic controllers on-board a vehicle, the gateway device comprising: one or more memories; and circuitry, that in operation, receives firmware update information from an external device external to the vehicle, the firmware update information including updated firmware to be applied to a first electronic controller from among the plurality of electronic controllers, determines whether or not the first electronic controller satisfies a first condition, based on first information about the first electronic controller, causes, if the first condition is determined to be satisfied, the first electronic controller to execute a first process related to updating firmware, and causes, if the first condition is determined not to be satisfied, a first device other than the first electronic controller to execute the first process.

Note that these general or specific aspects may also be realized by a device, system, integrated circuit, computer program, or computer-readable recording medium such as a CD-ROM disc, and may also be realized by an arbitrary combination of a device, system, method, computer program, and recording medium.

According to the above aspect, further improvements may be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a received ID list;

FIG. 5 is a diagram illustrating an example of forwarding rules used by a gateway;

FIG. 6 is a diagram illustrating an example of a list of certain information (ECU information) according to Embodiment 1;

FIG. 12 is a diagram illustrating an example of vehicle ECU management information stored by a server;

Figure 1:
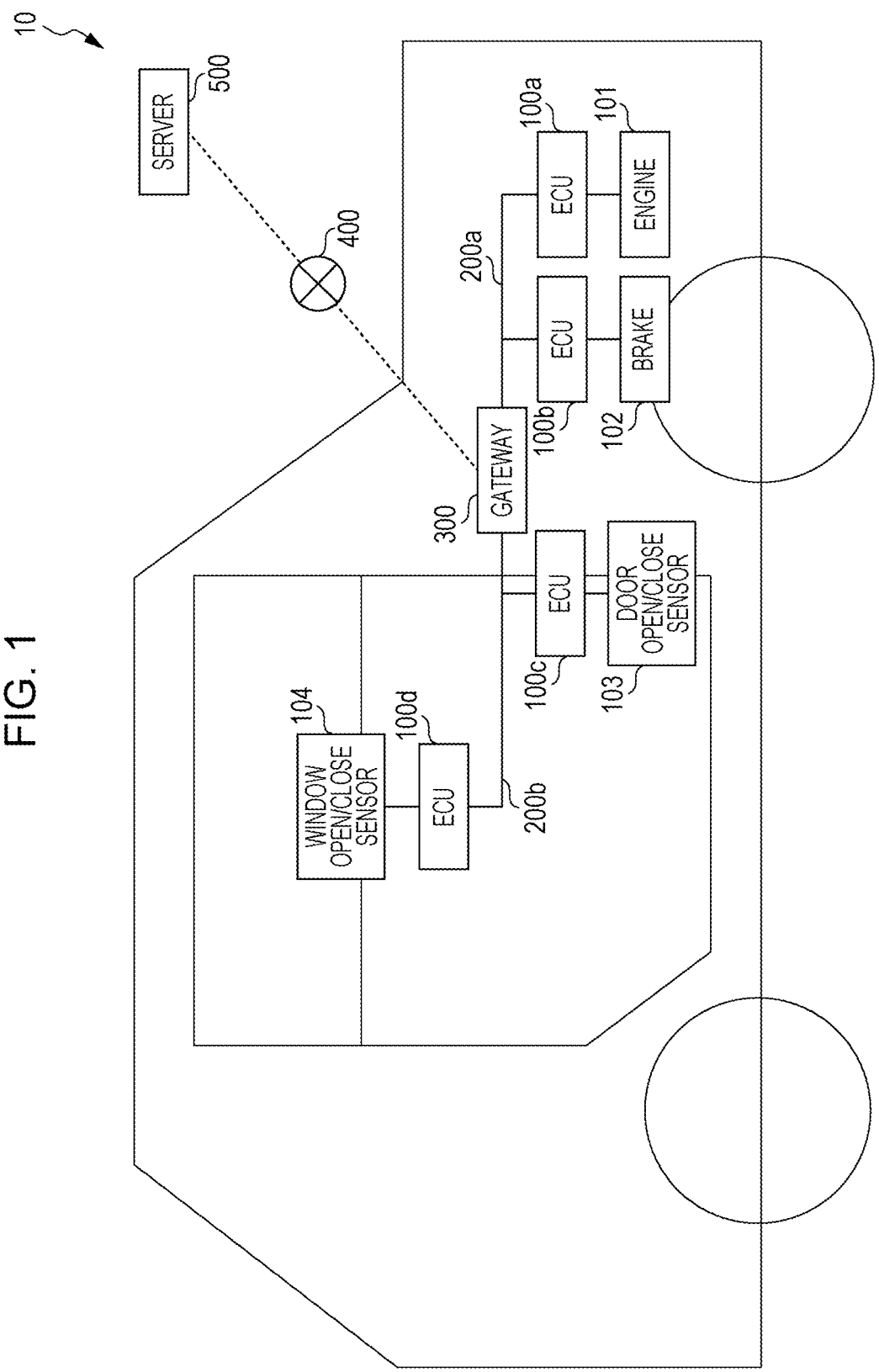
FIG. 1 is a diagram illustrating an overall configuration of an in-vehicle network system according to Embodiment 1.

DETAILED DESCRIPTION (Underlying Knowledge Forming Basis of the Present Disclosure)

The technology of PTL 1 executes a firmware update at a suitable (for example, a safe) timing, but is not useful in cases in which the ECU does not include the function of conducting some kind of process necessary for a firmware update.

In light of the above findings, the inventor worked on the following improvements to address the above issue.

A gateway device according to an aspect of the present disclosure is a gateway device connected via one or more buses to a plurality of electronic controllers on-board a vehicle, the gateway device comprising: one or more memories; and circuitry, that in operation, receives firmware update information from an external device external to the vehicle, the firmware update information including updated firmware to be applied to a first electronic controller from among the plurality of electronic controllers, determines whether or not the first electronic controller satisfies a first condition, based on first information about the first electronic controller, causes, if the first condition is determined to be satisfied, the first electronic controller to execute a first process related to updating firmware, and causes, if the first condition is determined not to be satisfied, a first device other than the first electronic controller to execute the first process.

Consequently, in the case in which, from among electronic control units (ECUs) connected to a bus, the ECU whose firmware is to be updated does not include a function for executing a certain process related to the update (such as a signature verification process, for example), or in the case of a situation in which the certain process cannot be executed, for example, a gateway device is able to perform control so that another ECU or the gateway device itself executes the certain process instead of (in other words, as a proxy for) the ECU. For this reason, a firmware update may be performed suitably, even for an ECU that does not have the functions necessary to conduct a firmware update while ensuring security, for example.

A configuration is also possible in which the first information indicates a processing capability of the first electronic controller. Consequently, a firmware update may be performed suitably, even if the ECU on which to apply the updated firmware (the ECU to update) does not have the processing capability to be able to conduct the certain process.

A configuration is also possible in which the first information indicates whether or not the first electronic controller includes a function of executing the first process, and in the determining, the first condition is determined to be satisfied if the first electronic controller includes the function of executing the first process, and the first condition is determined not to be satisfied if the first electronic controller does not include the function of executing the first process. Consequently, even if the ECU on which to apply the updated firmware does not include a function of executing a certain process that is useful for conducting an update suitably, the certain process is executed by proxy, and thus the firmware update may be performed suitably.

A configuration is also possible in which the firmware update information includes a signature attached to the updated firmware, and the first process is a process of verifying the signature. Consequently, even if an ECU does not include a signature verification function that conducts a process of verifying a signature attached to updated firmware, signature verification is executed by proxy, and thus the firmware update may be performed suitably while ensuring security.

A configuration is also possible in which the first process is a process of saving pre-update firmware held by the first electronic controller. Consequently, during a firmware update, even if an ECU is unable to save the pre-update firmware because of insufficient memory or the like, the process of saving the pre-update firmware is executed by proxy, thereby enabling restoration of the pre-update firmware if the firmware update fails.

A configuration is also possible in which, if the first condition is determined not to be satisfied, the circuitry selects, as the first device, a second electronic controller other than the first electronic controller from among the plurality of electronic controllers. Consequently, an ECU capable of executing the certain process is utilized effectively, and thus a firmware update may be performed suitably on an ECU that does not conduct the first process.

A configuration is also possible in which, if the first condition is determined not to be satisfied, the circuitry selects the gateway device as the first device. Consequently, the first process is executed by proxy by the gateway device, and thus a firmware update may be performed suitably on an ECU that does not conduct the first process.

A configuration is also possible in which, if the first condition is determined not to be satisfied, the circuitry selects, as the first device, an electronic controller that is other than the first electronic controller and that includes a key to use for verifying the signature from among the plurality of electronic controllers. Consequently, an ECU that includes a key for signature verification is utilized effectively, and thus a firmware update may be performed suitably on an ECU that does not include the verification key.

A configuration is also possible in which the plurality of electronic controllers communicate over the one or more buses in accordance with a controller area network (CAN) protocol. Consequently, a firmware update may be performed suitably on an ECU in an in-vehicle network conforming to CAN.

Also, an in-vehicle network system according to an aspect of the present disclosure is an in-vehicle network system provided with a plurality of electronic controllers that communicate over one or more buses, and a gateway device connected to the one or more buses, the gateway device comprising: one or more memories; and circuitry, that in operation, receives firmware update information from an external device external to the vehicle in which the gateway device is installed on-board, the firmware update information including updated firmware to be applied to a first electronic controller from among the plurality of electronic controllers, determines whether or not the first electronic controller satisfies a first condition, based on first information about the first electronic controller, causes, if the first condition is determined to be satisfied, the first electronic controller to execute a first process related to updating firmware, and causes, if the first condition is determined not to be satisfied, a first device other than the first electronic controller to execute the first process, Consequently, a firmware update may be performed suitably, even for an ECU that does not have the functions necessary to conduct a firmware update while ensuring security, for example.

Also, a firmware update method according to an aspect of the present disclosure is a method used in an in-vehicle network system provided with a plurality of electronic controllers that communicate over one or more buses, the method comprising: receiving firmware update information from an external device external to the vehicle in which the plurality of electronic controllers is installed on-board, the firmware update information including updated firmware to be applied to a first electronic controller from among the plurality of electronic controllers; determining whether or not the first electronic controller satisfies a first condition, based on first information about the first electronic controller; causing, if the first condition is determined to be satisfied, the first electronic controller to execute a first process related to updating firmware; and causing, if the first condition is determined not to be satisfied, a first device other than the first electronic controller to execute the first process. Consequently, a firmware update may be performed suitably.

Note that these general or specific aspects may also be realized by a system, method, integrated circuit, computer program, or computer-readable recording medium such as a CD-ROM disc, and may also be realized by an arbitrary combination of a system, method, integrated circuit, computer program, and recording medium.

Hereinafter, an in-vehicle network system including a gateway device according to an embodiment will be described with reference to the drawings. Each of the embodiments indicated herein illustrates a specific example of the present disclosure. Consequently, features such as numerical values, structural elements, layout positions and connection states of structural elements, as well as steps and the ordering of steps indicated in the following embodiments are merely examples, and are not intended to limit the present disclosure. Among the structural elements in the following embodiments, structural elements that are not described in the independent claims are arbitrary or optional structural elements. Also, the drawings are diagrammatic views, and are not necessarily drawn strictly.

Embodiment 1

Hereinafter, as an embodiment of the present disclosure, a firmware update method used in an in-vehicle network system 10 in which multiple electronic control units (ECUs), including a gateway device, communicate over buses will be described using the drawings. The firmware update method is a method for updating the firmware (FW) installed in each ECU on-board a vehicle to new, updated firmware (in other words, replacing the firmware with updated firmware) delivered from a server located externally to the vehicle. In the in-vehicle network system 10, the firmware update method is used so that when an ECU conducts a firmware update, the gateway device executes a process necessary for conducting a suitable firmware update safely (such as a signature verification process, for example) instead of an ECU unable to execute the process. Consequently, a suitable firmware update becomes possible, even for an ECU that does not include the function of executing the process necessary for the firmware update or the like, or an ECU that is in a state of being unable to execute such a function.

1.1 Overall Configuration of In-Vehicle Network System 10

FIG. 1 is a diagram illustrating an overall configuration of the in-vehicle network system 10 according to Embodiment 1.

The in-vehicle network system 10 is an example of a network communication system that communicates in accordance with the CAN protocol, and is a network communication system in a vehicle having various types of equipment, such as control devices, sensors, actuators, and user interface devices installed on-board. The in-vehicle network system 10 is equipped with multiple devices that communicate by frames via buses, and uses a firmware update method. Specifically, as illustrated in FIG. 1, the in-vehicle network system 10 is configured to include ECUs 100a to 100d connected to various equipment on-board the vehicle, buses 200a and 200b, a gateway 300, as well as a network 400 and a server 500 outside the vehicle. Note that although the in-vehicle network system 10 may include any number of ECUs other than the gateway 300 and the ECUs 100a to 100d, the description herein will focus on the gateway 300 and the ECUs 100a to 100d for the sake of convenience. An ECU is a device that includes components such as a processor (microprocessor), digital circuits such as memory, analog circuits, and communication circuits. The memory is memory such as ROM and RAM, and is able to store a control program (a computer program as software) executed by the processor. The firmware is all or part of the control program, and is stored in non-volatile memory (designated the boot ROM) such as electrically erasable read-only memory (EEPROM), for example. For example, by having the processor operate by following the control program (computer program), the ECU realizes various functions. Note that the computer program herein is made up of a plural combination of instruction codes indicating commands to the processor in order to achieve a designated function. Note that the firmware may also include all or some of the microcode for command interpretation in the processor.

The ECUs 100a to 100d are connected to equipment such as an engine 101, a brake 102, a door open/close sensor 103, and a window open/close sensor 104, respectively, acquiring the respective states of the equipment and periodically transmitting frames indicating the states (data frames) to an in-vehicle network made up of devices such as the buses 200a and 200b.

The gateway 300 is a type of ECU that acts as a gateway device connecting the bus 200a, to which the ECU 100a and the ECU 100b are connected, and the bus 200b, to which the ECU 100c and the ECU 100d are connected. The gateway 300 includes a function of forwarding a frame received from one bus to the other bus, and also includes a function of communicating with the server 500 via the network 400.

The server 500 that acts as an external device located externally to the vehicle is a computer that includes a function of delivering via the network 400 FW update information, which is data for updating the firmware of the ECUs 100a to 100d. For communication on the network 400, any wired or wireless communication protocol may be applied.

The respective ECUs in the in-vehicle network system 10 exchange frames in accordance with the CAN protocol. Frames in the CAN protocol include data frames, remote frames, overload frames, and error frames.

1.2 Data Frame Format

Hereinafter, a data frame, which is one of the frames used on a network following the CAN protocol, will be described.

Figure 2:
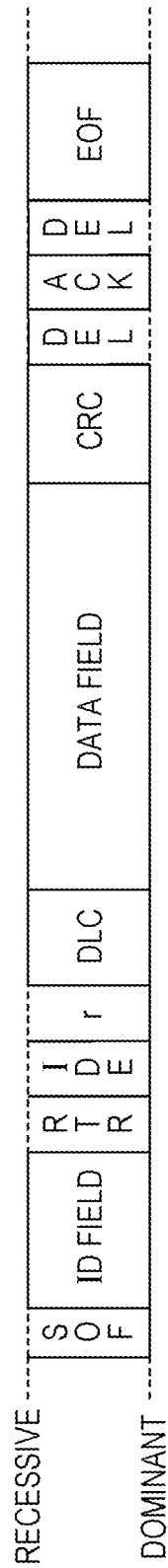
FIG. 2 is a diagram illustrating the data frame format prescribed by the CAN protocol.

FIG. 2 is a diagram illustrating the data frame format prescribed by the CAN protocol. FIG. 2 illustrates a data frame in the standard ID format prescribed by the CAN protocol. A data frame is made up of the following fields: Start of Frame (SOF), ID field, Remote Transmission Request (RTR), Identifier Extension (IDE), reserved bit "r", Data Length Code (DLC), data field, cyclic redundancy check (CRC) sequence, CRC delimiter "DEL", Acknowledgement (ACK) slot, ACK delimiter "DEL", and End of Frame (EOF).

The SOF is made up of one bit in the dominant state. The idle state of a bus is recessive, and changing to dominant with the SOF is a notification of the start of the transmission of a frame.

The ID field is an 11-bit field storing an ID (message ID), which is a value indicating the type of data. When multiple nodes start transmission at the same time, to conduct communication mediation with the ID field, the frame having the ID with the smaller value is designed to take higher priority.

The RTR is a value for distinguishing between a data frame and a remote frame, and is made up of one dominant bit in a data frame.

The IDE and "r" are both made up of one dominant bit.

The DLC is made up of 4 bits, and is a value indicating the length of the data field. Note that the IDE, "r", and the DLC are collectively designated the control field.

The data field is made up of a maximum of 54 bits, and is a value indicating the content of the data to be transmitted. The length is adjustable in units of 8 bits. The format of the data to be sent is not prescribed by the CAN protocol, and is decided by the in-vehicle network system 10. Consequently, the data format depends on factors such as the model of the car and the manufacturer.

The CRC sequence is made up of 15 bits, and is computed according to the transmitted values of the SOF, the ID field, the control field, and the data field.

The CRC delimiter is made up of one recessive bit, and is a delimiter indicating the end of the CRC sequence. Note that the CRC sequence and the CRC delimiter are collectively designated the CRC field.

The ACK slot is made up of one bit. The transmitting node sets the ACK slot to recessive for transmission. If the receiving node is able to receive up through the CRC sequence correctly, the receiving node transmits the ACK slot as dominant. Since dominant is prioritized over recessive, if the ACK slot is dominant after transmission, the transmitting node is able to confirm that one of the receiving nodes received data successfully.

The ACK delimiter is made up of one recessive bit, and is a delimiter indicating the end of the ACK.

The EOF is made up of seven recessive bits, and indicates the end of the data frame.

1.3 Configuration of Gateway 300

Figure 3:
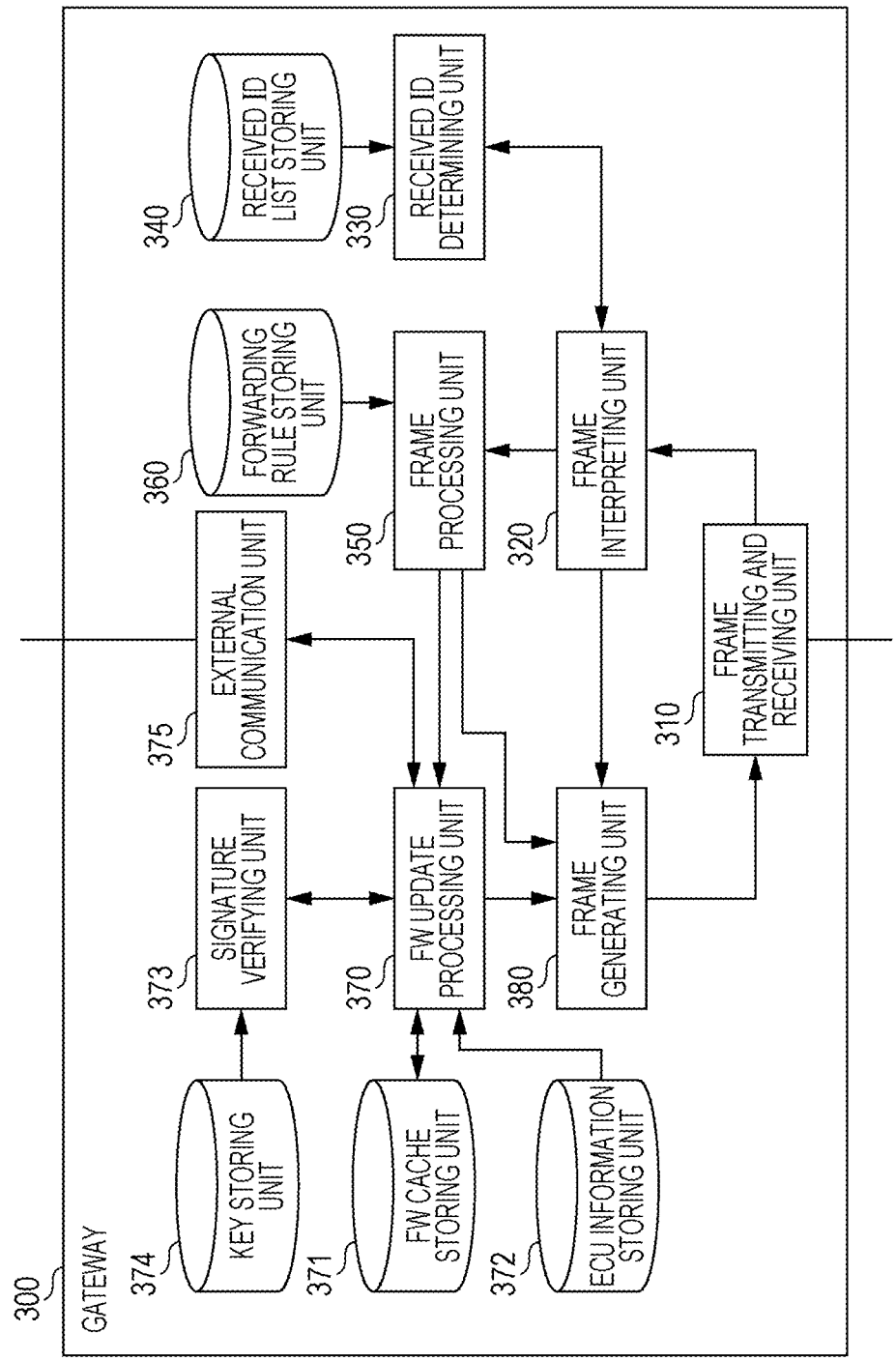
FIG. 3 is a configuration diagram of a gateway according to Embodiment 1.

FIG. 3 is a configuration diagram of the gateway 300. The gateway 300 executes functions such as forwarding frames between buses, and communicating with the external server 500 (such as receiving FW update information for updating the firmware of the ECUs 100a to 100d or the like). For this reason, as illustrated in FIG. 3, the gateway 300 is configured to include a frame transmitting and receiving unit 310, a frame interpreting unit 320, a received ID determining unit 330, a received ID list storing unit 340, a frame processing unit 350, a forwarding rule storing unit 360, a FW update processing unit 370, a firmware (FW) cache storing unit 371, an ECU information storing unit 372, a signature verifying unit 373, a key storing unit 374, an external communication unit 375, and a frame generating unit 380. These respective structural elements are realized by components in the gateway 300, such as a communication circuit, a processor that executes a control program stored in memory, memory, or a digital circuit.

The frame transmitting and receiving unit 310 transmits and receives frames in accordance with the CAN protocol to and from each of the bus 200a and the bus 200b. The bus 200a or the bus 200b receives a frame, and forwards the received frame to the frame interpreting unit 320. Additionally, based on bus information indicating the bus of the destination and a frame reported by the frame generating unit 380, the frame transmitting and receiving unit 310 transmits the content of the frame to the bus 200a or the bus 200b.

The frame interpreting unit 320 receives the values of a frame from the frame transmitting and receiving unit 310, and conducts interpretation to map the values to each field in the frame format prescribed by the CAN protocol. The frame interpreting unit 320 forwards the value determined to be the ID field to the received IDthe received ID determining unit 330. Depending on a determination result reported by the received IDthe received ID determining unit 330, the frame interpreting unit 320 decides whether to forward the value of the ID field and the data field (data) appearing after the ID field to the frame processing unit 350, or stop the reception of the frame. In addition, in the case of determining that the frame does not adhere to the CAN protocol, the frame interpreting unit 320 notifies the frame generating unit 380 to transmit an error frame. Also, if an error frame is received, the frame interpreting unit 320 discards the rest of the frame, or in other words, stops interpretation of the frame.

The received IDThe received ID determining unit 330 receives the value of the ID field reported by the frame interpreting unit 320, and follows a message ID list stored by the received ID list storing unit 340 to determine whether or not to receive each field in the frame following the ID field. The received ID determining unit 330 reports the determination result to the frame interpreting unit 320.

The received ID list storing unit 340 stores a received ID list, which is a list of IDs (message IDs) that the gateway 300 is to receive. FIG. 4 is a diagram illustrating an example of a received ID list.

The frame processing unit 350 follows forwarding rules stored in the forwarding rule storing unit 360 to decide the bus to forward to according to the ID of the received frame, and reports to the frame generating unit 380 the bus information about the bus to forward to, as well as the message ID and data reported by the frame interpreting unit 320. Additionally, the frame processing unit 350 reports to the FW update processing unit 370 data about an update result related to a firmware update reported by the frame interpreting unit 320. Note that the frame processing unit 350 does not treat data about an update result related to a firmware update as data to forward.

The forwarding rule storing unit 360 stores forwarding rules, which are information expressing rules for forwarding frames for each bus. FIG. 5 is a diagram illustrating an example of forwarding rules.

The FW update processing unit 370 requests the signature verifying unit 373 for a signature verification of FW update information including FW data such as updated firmware reported by the external communication unit 375, and receives a signature verification result (successful or not). The FW update processing unit 370 distinguishes, based on a list of ECU information stored by the ECU information storing unit 372, whether or not the ECU whose firmware is to be updated from among the respective ECUs connected to the in-vehicle network (the buses 200a and 200b) includes a function of executing a process necessary for the firmware update. If the ECU whose firmware is to be updated does not include the function of executing a process necessary for the firmware update, the FW update processing unit 370 performs control so that the function is conducted by proxy by the gateway 300. One function of executing a process necessary for a firmware update is the function of verifying a signature attached to FW data related to the firmware (FW) of an individual ECU in the FW update information (signature verification function). Another function of executing a process necessary for a firmware update is a function of storing (saving) pre-update firmware to a storage medium such as memory when an ECU updates its firmware, and if the update fails, restoring the saved firmware (FW cache function). In other words, the FW cache function includes a function of conducting a pre-update firmware saving process. In the case of executing the FW cache function by proxy, the FW update processing unit 370 performs control to receive the pre-update firmware from the ECU whose firmware is to be updated, store (save) the pre-update firmware in the FW cache storing unit 371, and if necessary, retrieve the saved firmware from the FW cache storing unit 371, and transmit the retrieved firmware so that the ECU whose firmware is to be updated is able to receive the firmware. In the case of executing the signature verification function by proxy, the FW update processing unit 370 requests the signature verifying unit 373 to verify a signature attached to FW data corresponding to the ECU whose firmware is to be updated. Additionally, the FA update processing unit 370 reports to the frame generating unit 380 the FW data related to the updated firmware and the bus information about the bus to which is connected the ECU to update. Additionally, the FW update processing unit 370 reports to the external communication unit 375 a report from the ECU (such as an update result) reported by the frame processing unit 350. Additionally, the FW update processing unit 370 reports to the frame generating unit 380 data necessary to communicate with the ECUs 100a to 100d during a firmware update. Note that the FW update processing unit 370 functions as a control unit that determines, based on information about the ECU on which to apply the updated firmware (the ECU to update), whether or not the ECU satisfies a certain condition (a condition such as including the signature verification function and including the FW cache function), and if the certain condition is satisfied, causes the relevant ECU to execute a certain process related to the firmware update (such as a process of signature verification and a process related to the FW cache function), whereas if the certain condition is not satisfied, performs control so that the certain process is executed by a component other than the relevant ECU (herein, the gateway 300).

The FW cache storing unit 371 is realized by a storage area such as non-volatile memory in the gateway 300, for example, and is used for actions during a firmware update such as storing (saving) existing firmware received from the ECUs 100b and 100d, which are ECUs to be updated, but which do not include the FW cache function.

The ECU information storing unit 372 stores a list of ECU information, which is certain information respectively related to all of the ECUs (ECUs 100a to 100d) joined to the bus 200a and the bus 200b. An example of the list of ECU information is illustrated in FIG. 6.

The signature verifying unit 373 receives data on which to perform signature verification related to FW update information from the FW update processing unit 370, performs signature verification using a key for signature verification acquired from the key storing unit 374, and reports the verification result to the FW update processing unit 370.

The key storing unit 374 stores a key for signature verification related to FW update information received from the server 500.

The external communication unit 375 functions as a reception unit that receives FW update information including FW data related to updated firmware from the server 500, and reports the received FW update information to the FW update processing unit 370. Additionally, the external communication unit 375 transmits an update result reported by the FW update processing unit 370 to the server 500. The external communication unit 375 stores in advance address information of the server 500 needed to access the server 500 via the network 400, for example. Note that in the gateway 300, FW data and the like received from the server 500 may be converted into a format as needed for inclusion in a frame conforming to the CAN protocol, and transmitted to the ECUs 100a to 100d.

The frame generating unit 380 reports and transmits to the frame transmitting and receiving unit 310 an error frame in accordance with a request to transmit an error frame reported from the frame interpreting unit 320. In addition, the frame generating unit 380 constructs a frame using the message ID and data reported by the frame processing unit 350, and passes the frame together with bus information to the frame transmitting and receiving unit 310. In addition, the frame generating unit 380 constructs a frame using FW data related to updated firmware reported by the FWV update processing unit 370, and passes the frame together with bus information to the frame transmitting and receiving unit 310.

1.4 Accepted ID List Example

FIG. 4 is a diagram illustrating an example of a received ID list stored in the received ID list storing unit 340 of the gateway 300.

The received ID list illustrated as an example in FIG. 4 is used to selectively receive and process frames including a message ID whose ID (message ID) value is any of "1", "2", "3", and "4". This is merely one example, but in the received ID list, the message IDs of frames that the gateway 300 is predetermined to receive are listed.

1.5 Forwarding Rules Example

FIG. 5 illustrates an example of forwarding rules stored by the forwarding rule storing unit 360 of the gateway 300.

These forwarding rules associate a forwarding source bus, a forwarding destination bus, and a forwarding target ID (message ID). In FIG. 5, "*" indicates that frames are forwarded regardless of the message ID. The example in FIG. 5 indicates that frames received from the bus 200a are configured to be forwarded to the bus 200b, regardless of the message ID. The example in FIG. 5 also indicates that, among the frames received from the bus 200b, only the frames having a message ID of "3" are configured to be forwarded to the bus 200a.

1.6 List of ECU Information Example

FIG. 6 illustrates an example of a list of ECU information stored by the ECU information storing unit 372 of the gateway 300.

The list illustrated in FIG. 6 is made up of ECU information about each ECU. The ECU information is configured to include, for example, an ECU-ID, an ECU type that indicates the functional type of the ECU, the manufacturing company of the ECU, information indicating whether or not the ECU includes the signature verification function (that is, the presence or absence of the signature verification function), and information indicating whether or not the ECU includes a FW cache as a region of a storage medium for realizing the FW cache function (that is, the presence or absence of the FW cache function). The ECU-ID is identification information for each ECU, for example, and is an identifier such as a serial number, for example. The list of ECU information stored by the ECU information storing unit 372 may be considered to be information indicating, for each ECU, the processing capabilities of the ECU (such as the presence or absence of the signature verification function and the FW cache function, for example).

The example in FIG. 6 indicates that, for the ECU 100a connected to the engine 101, the ECU-ID is "0001", the ECU type is a type used for engine control identified by "engine", the manufacturing company is "A Corp.", the signature verification function is included, and the FW cache function is included. FIG. 6 also indicates that, for the ECU 100b connected to the brake 102, the ECU-ID is "0002", the ECU type is a type used for brake control identified by "brake", the manufacturing company is "B Corp.", the signature verification function is included, and the FW cache function is not included. FIG. 6 also indicates that, for the ECU 100c connected to the door open/close sensor 103, the ECU-ID is "0003", the ECU type is a type used for door open/close control identified by "door", the manufacturing company is "C Corp.", the signature verification function is not included, and the FW cache function is included. FIG. 6 also indicates that, for the ECU 100d connected to the window open/close sensor 104, the ECU-ID is "0004", the ECU type is a type used for window open/close control identified by "window", the manufacturing company is "D Corp.", the signature verification function is not included, and the FW cache function is not included.

The ECU information stored by the ECU information storing unit 372 may be set during manufacturing, or may be acquired by the gateway 300 from an external device such as the server 500 when a supply of power to the gateway 300 is started, for example. Additionally, if an ECU connected to the bus 200a or 200b is replaced or changes state due to a firmware update or the like, or if an ECU is newly introduced into the vehicle and connected to the bus 200a or the bus 200b, the gateway 300 may collect new ECU information and update the list of ECU information stored by the ECU information storing unit 372.

1.7 Configuration of ECU 100a

Figure 7:
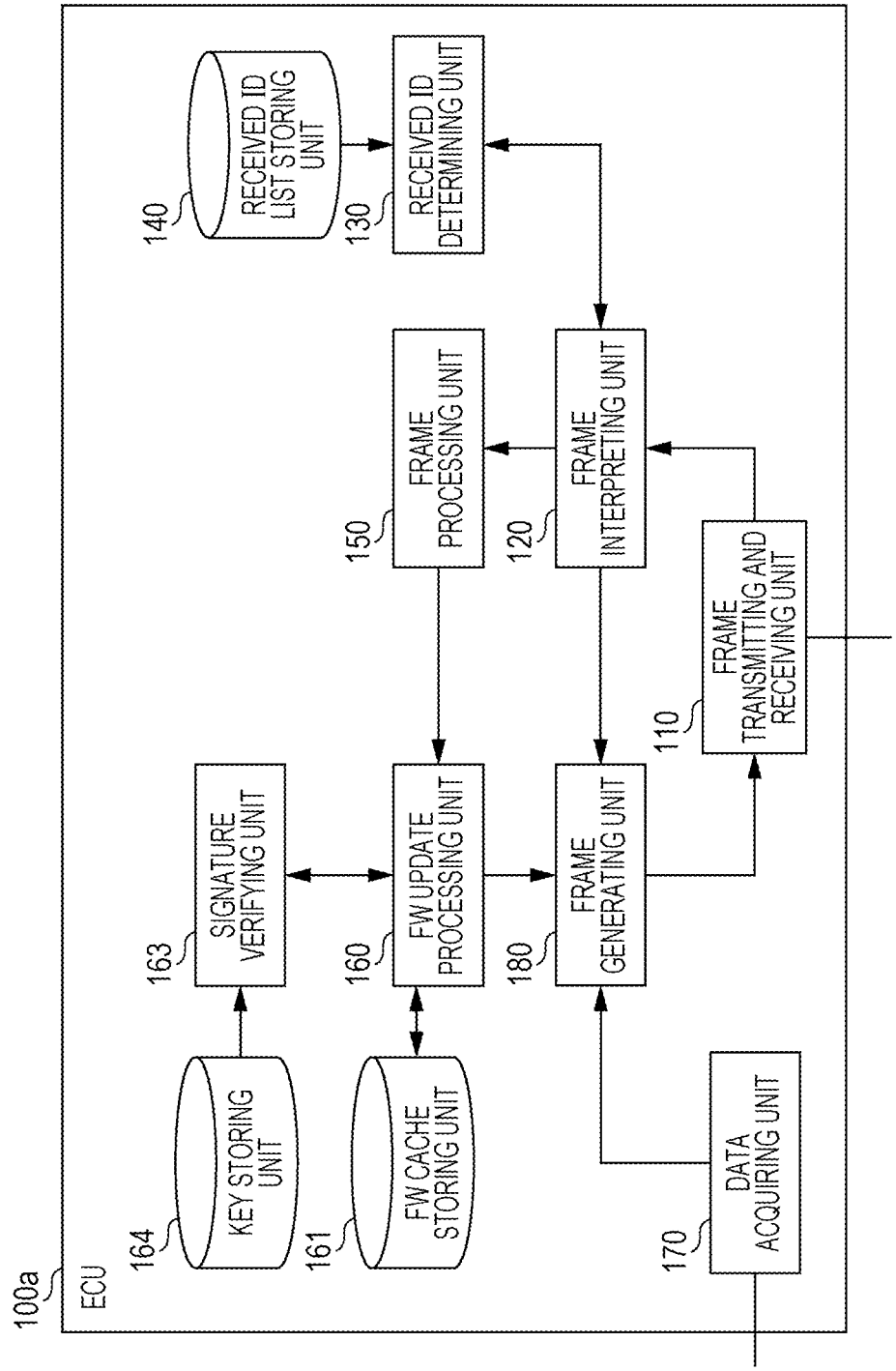
FIG. 7 is a configuration diagram of an ECU that includes a signature verification function and a firmware (FW) cache function according to Embodiment 1.

FIG. 7 is a configuration diagram of the ECU 100a. The ECU 100a includes the signature verification function and the FW cache function, and is configured to include a frame transmitting and receiving unit 110, a frame interpreting unit 120, a received ID determining unit 130, a received ID list storing unit 140, a frame processing unit 150, a FW update processing unit 160, a FW cache storing unit 161, a signature verifying unit 163, a key storing unit 164, a data acquiring unit 170, and a frame generating unit 180. These respective structural elements are realized by components in the ECU 100a, such as a communication circuit, a processor that executes a control program stored in memory, memory, or a digital circuit.

The frame transmitting and receiving unit 110 transmits and receives frames in accordance with the CAN protocol to and from the bus 200a. The frame transmitting and receiving unit 310 receives a frame one bit at a time from a bus, and forwards the received frame to the frame interpreting unit 120. Additionally, the frame transmitting and receiving unit 110 transmits the content of a frame received in a notification from the frame generating unit 180 to the bus 200a.

The frame interpreting unit 120 receives the values of a frame from the frame transmitting and receiving unit 110, and conducts interpretation to map the values to each field in the frame format prescribed by the CAN protocol. The value determined to be the ID field is forwarded to the received ID determining unit 130. Depending on a determination result reported by the received ID determining unit 130, the frame interpreting unit 120 decides whether to forward the value of the ID field and the data field appearing after the ID field to the frame processing unit 150, or stop the reception of the frame after receiving the determination result. In addition, in the case of determining that the frame does not adhere to the CAN protocol, the frame interpreting unit 120 notifies the frame generating unit 180 to transmit an error frame. Also, if an error frame is received, the frame interpreting unit 120 discards the rest of the frame, or in other words, stops interpretation of the frame.

The received ID determining unit 130 receives the value of the ID field indicated in a notification from the frame interpreting unit 120, and follows a message ID list stored by the received ID list storing unit 140 to determine whether or not to receive each field in the frame following the ID field. The received ID determining unit 130 reports the determination result to the frame interpreting unit 120.

The received ID list storing unit 140 stores a received ID list, which is a list of message IDs that the ECU 100a is to receive. This accepted ID list is similar to the example in FIG. 4 discussed earlier, for example.

The frame processing unit 150 conducts a different process for each ECU according to the data of the received frame. For example, the ECU 100a connected to the engine 101 is equipped with a function of emitting an alarm sound if the door is open while in a state in which the speed exceeds 30 km. Additionally, the frame processing unit 150 of the ECU 100a manages data received from other ECUs (for example, information indicating the state of a door), and conducts a process such as emitting an alarm sound under a certain condition based on the speed acquired from the engine 101. The frame processing unit 150 is also provided in the ECUs 100b to 100d, and in the ECU 100c, is equipped with a function of emitting an alarm sound if a door is opened in a situation in which the brake is not applied. In the ECUs 100b and 100d, the frame processing unit 150 does not do anything in particular. Note that the ECUs 100a to 100d may also be equipped with functions other than the above. Additionally, when FW data for updating firmware is acquired, the frame processing unit 150 reports the FW data to the FW update processing unit 160.

The FW update processing unit 160 requests the signature verifying unit 163 for a signature verification of FW data received from the gateway 300 and reported from the frame processing unit 150, and if the signature verification is successful, updates (rewrites) the firmware inside the boot ROM of the ECU 100a based on the FW data. The boot ROM is non-volatile memory set as a storage destination for firmware to be executed after a reset by the processor of the ECU 100a, for example. When updating the firmware inside the boot ROM, the FW update processing unit 160 stores (saves) the existing firmware in the FW cache storing unit 161, for example, to enable recovery to the pre-update state if the update fails. In addition, the FW update processing unit 160 notifies the frame generating unit 180 to generate and transmit a frame indicating the result of the signature verification of the FW data (information indicating success or failure) and a frame indicating the update result of the firmware based on the FW data.

The FW cache storing unit 161 is realized by a storage area such as non-volatile memory in the ECU 100a, for example, and is used for actions such as storing (saving) the existing firmware when updating the firmware inside the boot ROM.

The signature verifying unit 163 receives FW data on which to perform signature verification from the FW update processing unit 160, performs signature verification using a key for signature verification acquired from the key storing unit 164, and reports the verification result to the FW update processing unit 160.

The key storing unit 164 stores a key for signature verification of FW data used to update the firmware.

The data acquiring unit 170 acquires data indicating the states of components such as equipment and sensors connected to the ECU, and reports to the frame generating unit 180.

The frame generating unit 180 constructs an error frame in accordance with a notification of instructions to transmit an error frame from the frame interpreting unit 120, and passes the error frame to the frame transmitting and receiving unit 110 for transmission. Additionally, the frame generating unit 180 constructs a frame by attaching a predetermined message ID to the value of the data reported by the data acquiring unit 170, and passes the constructed frame to the frame transmitting and receiving unit 110. Additionally, the frame generating unit 180 constructs frames with respectively predetermined message IDs attached according to instructions from the FW update processing unit 160 to generate a frame about the result of firmware signature verification or a frame about the firmware update result, and passes the constructed frames to the frame transmitting and receiving unit 110.

1.8 Configuration of ECU 100b

Figure 8:
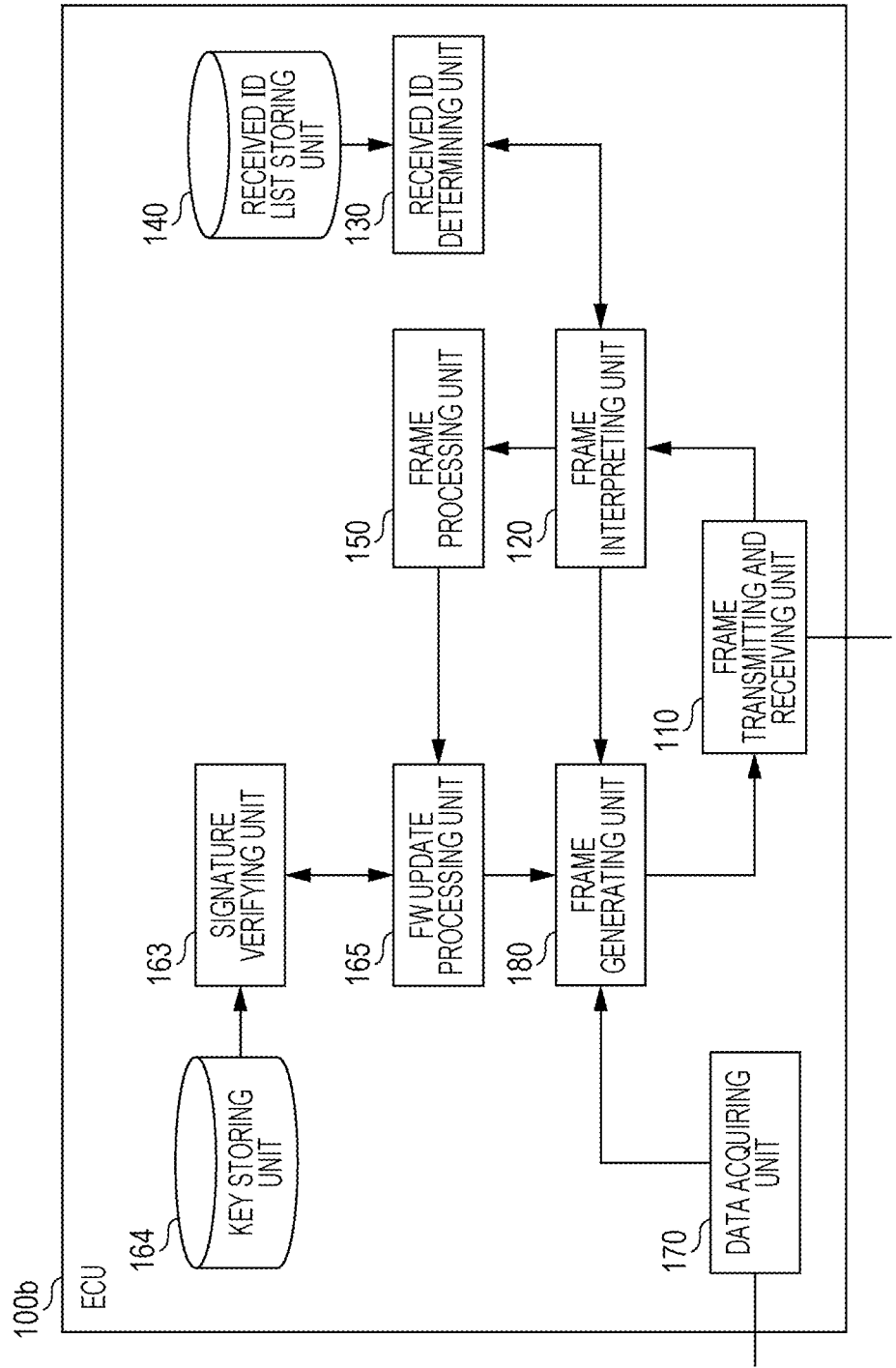
FIG. 8 is a configuration diagram of an ECU that includes a signature verification function according to Embodiment 1.

FIG. 8 is a configuration diagram of the ECU 100b. The ECU 100b includes the signature verification function but not the FW cache function, and is configured to include the frame transmitting and receiving unit 110, the frame interpreting unit 120, the received ID determining unit 130, the received ID list storing unit 140, the frame processing unit 150, a FW update processing unit 165, the signature verifying unit 163, the key storing unit 164, the data acquiring unit 170, and the frame generating unit 180. These respective structural elements are realized by components in the ECU 100b, such as a communication circuit, a processor that executes a control program stored in memory, memory, or a digital circuit. Note that structural elements of the ECU 100b which are similar to those of the ECU 100a are denoted in FIG. 8 with the same signs as FIG. 7, and description thereof will be reduced or omitted herein.

The FW update processing unit 165 requests the signature verifying unit 163 for a signature verification of FW data received from the gateway 300 and reported from the frame processing unit 150, and notifies the frame generating unit 180 to generate and transmit a frame indicating the result of the signature verification of the FW data (information indicating success or failure). In addition, if the FW update processing unit 165 is notified by the frame processing unit 150 that a request for the data inside the boot ROM (firmware) has been received from the gateway 300, the FW update processing unit 165 notifies the frame generating unit 180 to generate and transmit a frame including the existing firmware inside the boot ROM as data. The boot ROM is non-volatile memory set as a storage destination for firmware to be executed after a reset by the processor of the ECU 100b, for example. In addition, the FW update processing unit 165 updates (rewrites) the contents of the boot ROM of the ECU 100b with update ROM data (updated firmware) received from the gateway 300 and reported from the frame processing unit 150. Additionally, the FW update processing unit 165 notifies the frame generating unit 180 to generate and transmit a frame indicating the firmware update result.

1.9 Configuration of ECU 100c

Figure 9:
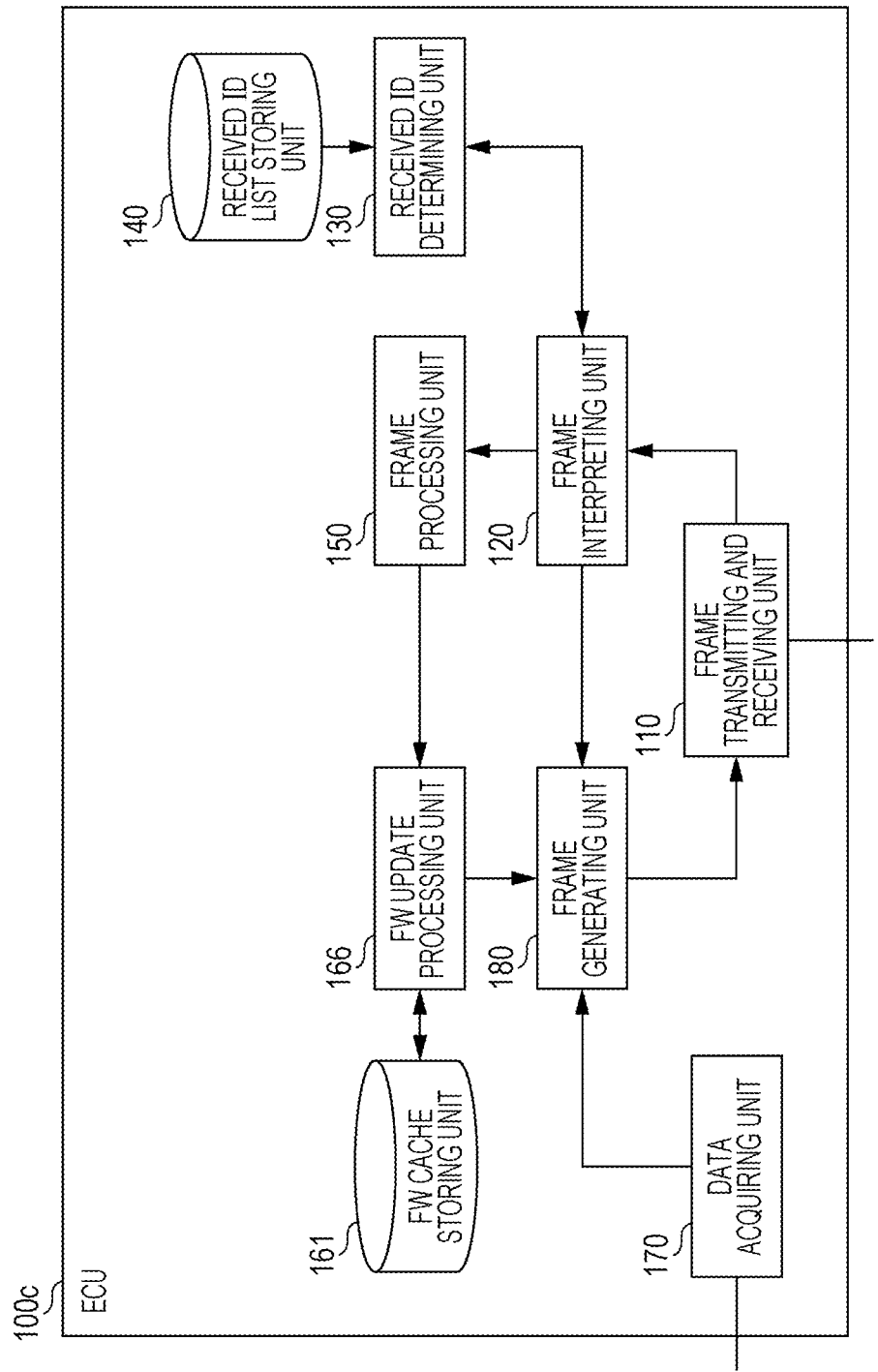
FIG. 9 is a configuration diagram of an ECU that includes a FW cache function according to Embodiment 1.

FIG. 9 is a configuration diagram of the ECU 100c. The ECU 100c does not include the signature verification function, but does include the FW cache function, and is configured to include the frame transmitting and receiving unit 110, the frame interpreting unit 120, the received ID determining unit 130, the received ID list storing unit 140, the frame processing unit 150, a FW update processing unit 166, the FW cache storing unit 161, the data acquiring unit 170, and the frame generating unit 180. These respective structural elements are realized by components in the ECU 100c, such as a communication circuit, a processor that executes a control program stored in memory, memory, or a digital circuit. Note that structural elements of the ECU 100c which are similar to those of the ECU 100a are denoted in FIG. 9 with the same signs as FIG. 7, and description thereof will be reduced or omitted herein.

The FW update processing unit 166 updates (rewrites) the firmware inside the boot ROM of the ECU 100c based on FW data received from the gateway 300 and reported from the frame processing unit 150. The boot ROM is non-volatile memory set as a storage destination for firmware to be executed after a reset by the processor of the ECU 100c, for example. When updating the firmware inside the boot ROM, the FW update processing unit 166 stores (saves) the existing firmware in the FW cache storing unit 161, for example, to enable recovery to the pre-update state if the update fails. Additionally, the FW update processing unit 166 notifies the frame generating unit 180 to generate and transmit a frame indicating the update result of the firmware based on the FW data.

1.10 Configuration of ECU 100d

Figure 10:
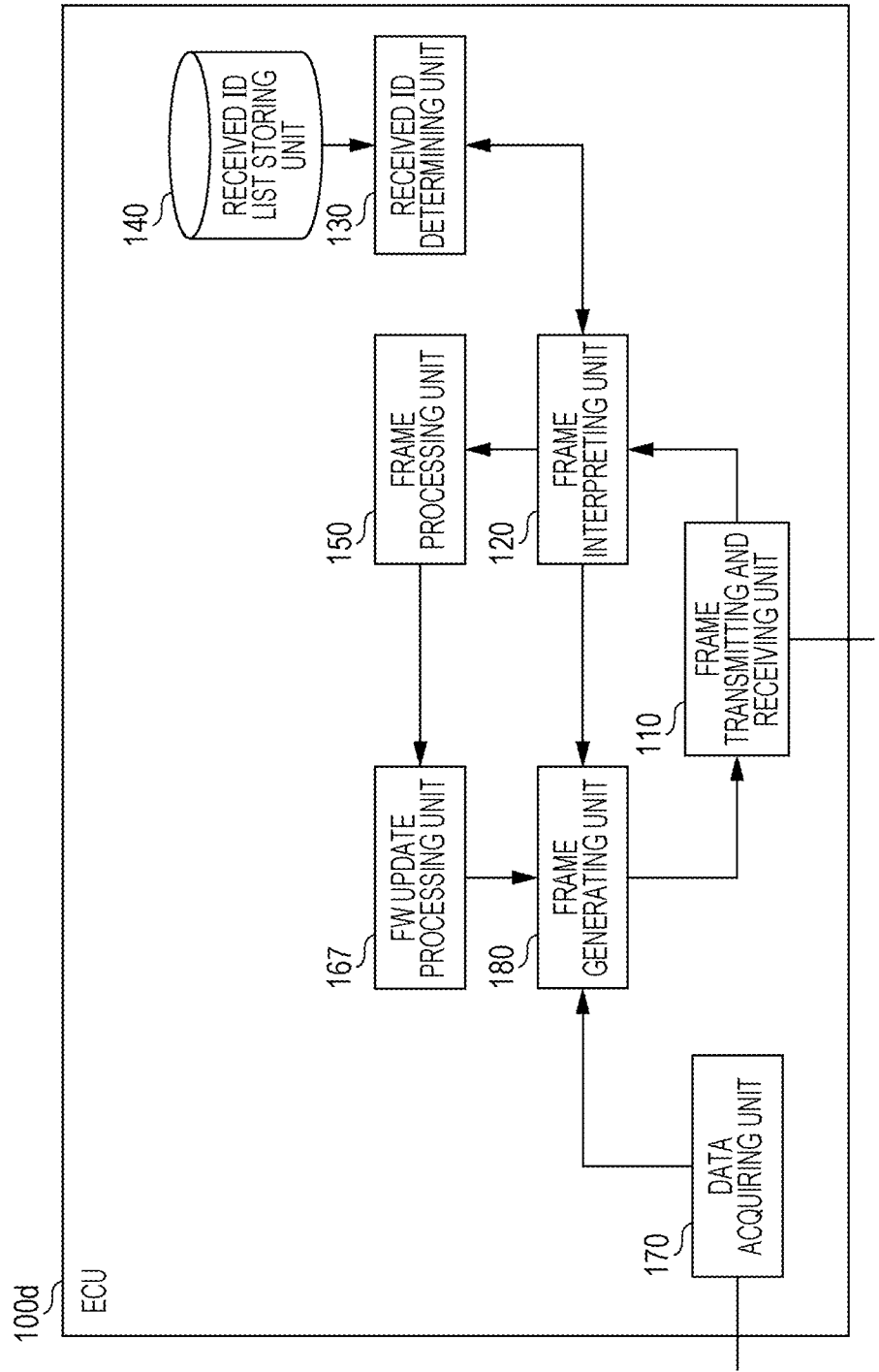
FIG. 10 is a configuration diagram of an ECU that does not include a signature verification function and a FW cache function according to Embodiment 1.

FIG. 10 is a configuration diagram of the ECU 100d. The ECU 100d does not include the signature verification function or the FW cache function, and is configured to include the frame transmitting and receiving unit 110, the frame interpreting unit 120, the received ID determining unit 130, the received ID list storing unit 140, the frame processing unit 150, a FW update processing unit 167, the data acquiring unit 170, and the frame generating unit 180. These respective structural elements are realized by components in the ECU 100d, such as a communication circuit, a processor that executes a control program stored in memory, memory, or a digital circuit. Note that structural elements of the ECU 100d which are similar to those of the ECU 100a are denoted in FIG. 10 with the same signs as FIG. 7, and description thereof will be reduced or omitted herein.

If the FW update processing unit 167 is notified by the frame processing unit 150 that a request for the data inside the boot ROM (firmware) has been received from the gateway 300, the FW update processing unit 167 notifies the frame generating unit 180 to generate and transmit a frame including the existing firmware inside the boot ROM as data. The boot ROM is non-volatile memory set as a storage destination for firmware to be executed after a reset by the processor of the ECU 100d, for example. In addition, the FW update processing unit 167 updates (rewrites) the contents of the boot ROM of the ECU 100d with update ROM data (updated firmware) received from the gateway 300 and reported from the frame processing unit 150. Additionally, the FW update processing unit 167 notifies the frame generating unit 180 to generate and transmit a frame indicating the firmware update result.

1.11 Configuration of Server 500

The server 500 is a computer located externally to the vehicle in which the in-vehicle network system 10 is installed on-board, and includes components such as a storage medium like memory or a hard disk, a processor, and a communication circuit. The server 500 may also be equipped with components such as an input device (such as a keyboard) and a display as a user interface. Presupposing that multiple ECUs related to an in-vehicle network are installed on-board each of multiple vehicles, the server 500 includes a function of managing the firmware provided by the manufacturing companies or the like of various ECUs, and delivering FW update information including updated firmware to each vehicle.

Figure 11:
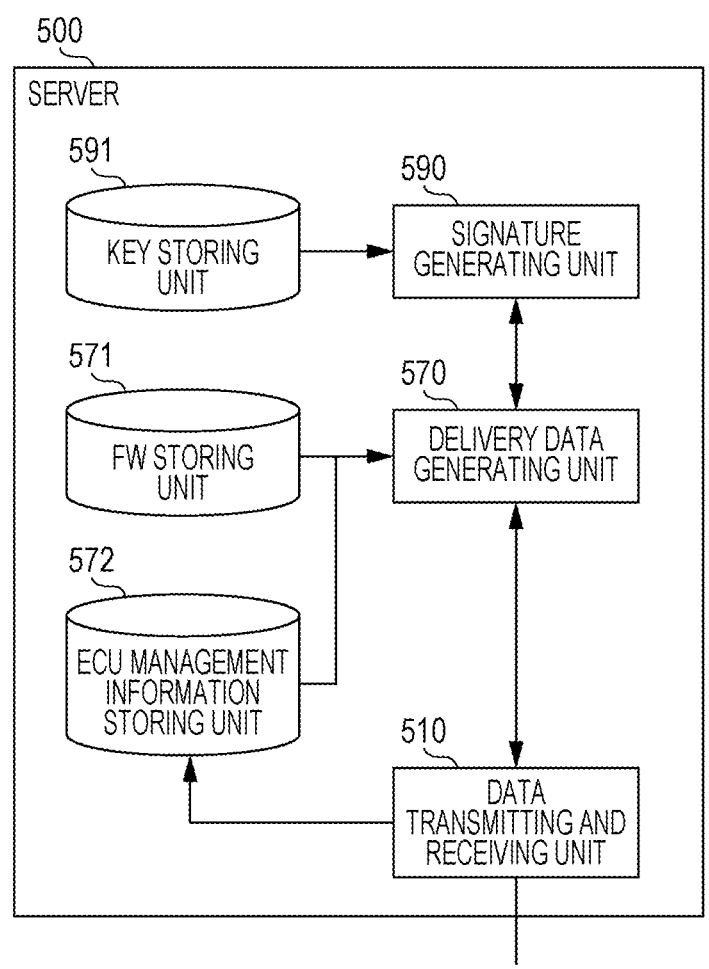
FIG. 11 is a configuration diagram of a server according to Embodiment 1.

FIG. 11 is a configuration diagram of the server 500. As illustrated in the diagram, the server 500 is configured to include a data transmitting and receiving unit 510, delivery data generating unit 570, a FW storing unit 571, an ECU management information storing unit 572, a signature generating unit 590, and a key storing unit 591. These respective structural elements are realized by components in the server 500, such as a communication circuit, or a processor that executes a control program stored in memory.

The data transmitting and receiving unit 510 communicates with the gateway 300 to transmit and receive data. The data transmitting and receiving unit 510 delivers data reported from the delivery data generating unit 570 (FW update information including firmware to update) to the gateway 300. In addition, in the case of receiving a firmware update result from the gateway 300, the data transmitting and receiving unit 510 updates vehicle ECU management information stored by the ECU management information storing unit 572.

The delivery data generating unit 570 generates FW update information (delivery data) as a package of updated firmware to be delivered to the gateway 300, and requests the signature generating unit 590 to generate a signature for the FW update information. To generate the FW update information, the delivery data generating unit 570 acquires the latest firmware (FW) for each ECU from the FW storing unit 571, and acquires information about an ECU to update from the ECU management information storing unit 572. The format of the FW update information (delivery data) will be discussed later (see FIG. 13).

The FW storing unit 571 stores firmware (FW) for various ECUs.

The ECU management information storing unit 572 stores vehicle ECU management information, which is information related to each ECU in the in-vehicle network of each vehicle. The vehicle ECU management information will be discussed later (see FIG. 12).

The signature generating unit 590 receives a request from the delivery data generating unit 570, uses a signature key stored in the key storing unit 591 to generate a signature for the FW update information, and passes the signature to the delivery data generating unit 570. The signature generating unit 590 may generate a signature for each piece of FW data in the FW update information, and a signature for the FW update information as a whole.

The key storing unit 591 stores a key that the signature generating unit 590 uses to sign the FW update information.

1.12 Vehicle ECU Management Information

FIG. 12 illustrates an example of vehicle ECU management information (a list of ECU information by vehicle) stored by the ECU management information storing unit 572 of the server 500.

The vehicle ECU management information in this example is configured to include vehicle information about each vehicle managed by the server 500, and ECU information about each ECU installed on-board a vehicle. The vehicle information is an identifier for identifying the vehicle (vehicle ID). In the vehicle ECU management information, the ECU information associated with the vehicle information is configured to include an ECU-ID, an ECU type that indicates the functional type of the ECU, the manufacturing company of the ECU, the presence or absence of the signature verification function, the presence or absence of the FW cache function, a FW version which is a version number or the like of the firmware installed in the ECU, and a latest FW version which is a version number or the like of the latest firmware corresponding to that ECU. Each piece of ECU information for a certain vehicle in the vehicle ECU management information is set based on information received from the gateway 300 of that vehicle (such as a firmware update result), and the FW versions of firmware uploaded to the server 500 from the manufacturing companies of various ECUs and stored in the FW storing unit 571, for example. Note that although FIG. 12 illustrates as an example only information related to a single vehicle A, the vehicle ECU management information may also include information about other vehicles.

1.13 FW Update Information Format Example

Figure 13:
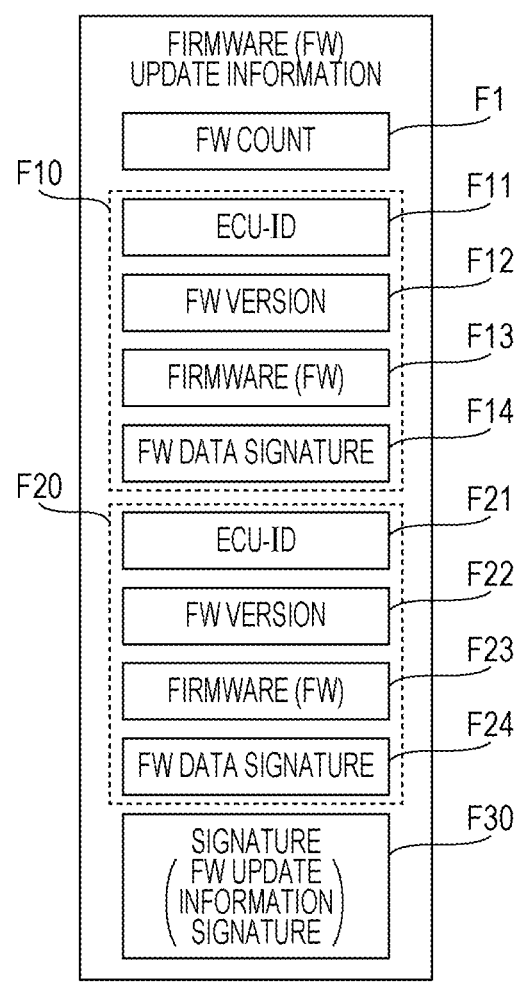
FIG. 13 is a diagram illustrating an example of the format of firmware (FW) update information according to Embodiment 1.

FIG. 13 illustrates an example of the format of FW update information as delivery data that the server 500 delivers.

The FW update information includes a FW count F1 indicating the number of pieces of FW data, one or more pieces of FW data (in the example of FIG. 13, two pieces of individual FW data F10 and F20), and a FW update information signature F30, which is a signature for the FW update information (delivery data) as a whole. The FW data F10 and F20 respectively includes updated firmware (FW) F13 and F23, ECU-IDs F11 and F21 that identify the target ECU, FW versions F12 and F22 that indicate the version number or the like of the firmware, and FW data signatures F14 and F24 which are respective signatures for these data. The firmware F13 and F23 is the firmware itself, or in other words, binary data.

1.14 Example Operations Related to Delivery of FW Update Information and Firmware Update Herein, operations related to the delivery of FW update information and ECU firmware update in the in-vehicle network system 10 will be described.

Figure 14:
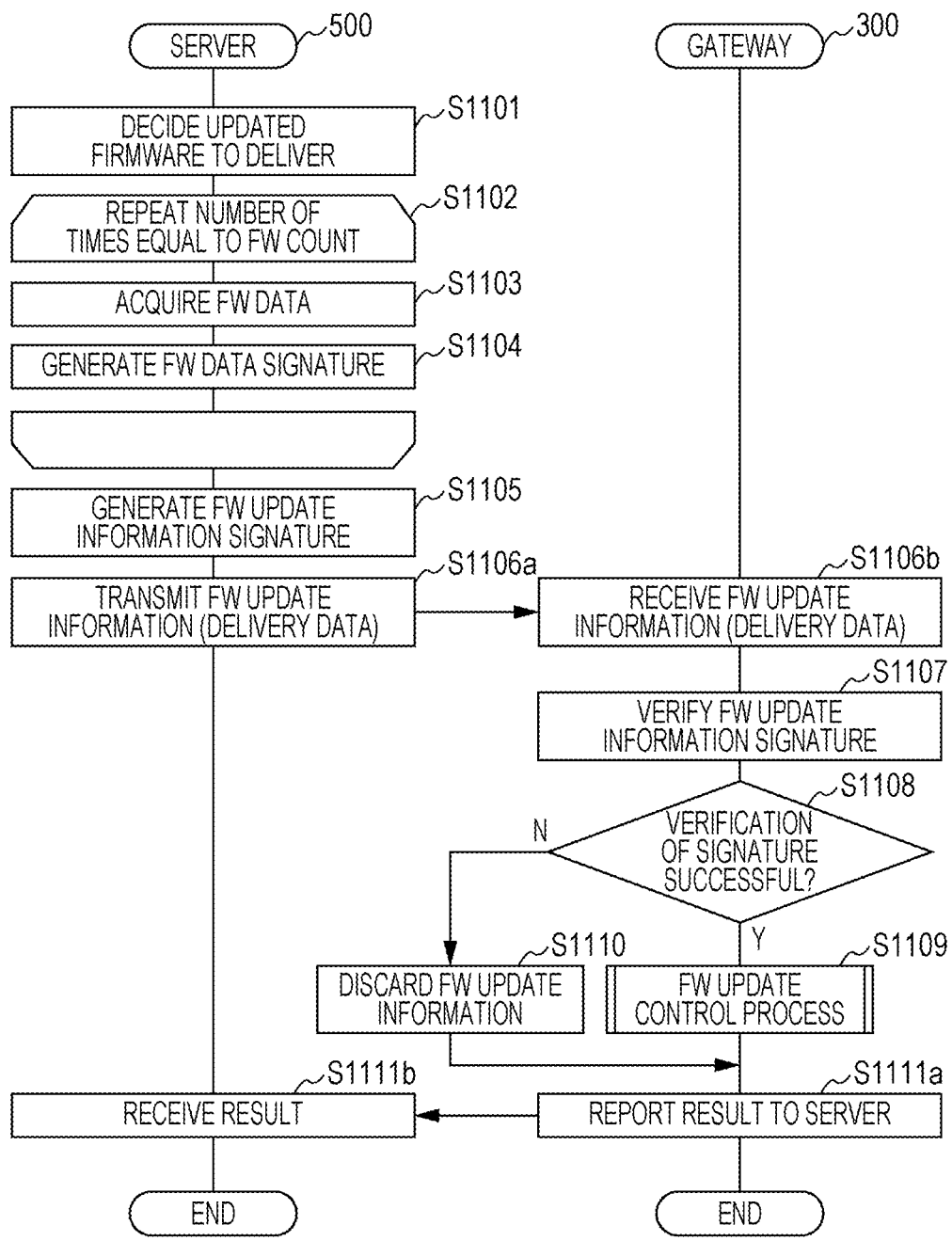
FIG. 14 is a sequence diagram illustrating example operations related to the delivery of FW update information according to Embodiment 1.

FIG. 14 is a sequence diagram illustrating example operations in which the server 500 delivers delivery data (FW update information) to the gateway 300, and a firmware update is conducted under the control of the gateway 300. Each sequence herein means the respective processing procedure (steps) in each device. The sequence may be started at the timing at which new firmware is uploaded and registered in the server 500, or in accordance with a delivery request from the gateway 300 of the vehicle acting as the delivery destination, for example.

The server 500, based on information such as the vehicle ECU management information stored by the ECU management information storing unit 572, decides one or more pieces of updated firmware to deliver to the gateway 300 (step S1101). The number of pieces of updated firmware is also decided by this decision.

Next, the server 500 generates FW update information (see FIG. 13) with the delivery data generating unit 570. In other words, the delivery data generating unit 570 repeats, for a number of times equal to the number of pieces of updated firmware (step S1102), the acquisition of FW data such as firmware stored by the FW storing unit 571 (step S1103) and the attachment of a FW data signature generated by the signature generating unit 590 to the FW data (step S1104). Also, the delivery data generating unit 570 causes the signature generating unit 590 to generate a signature for the FW update information (FW update information signature) (step S1105), and generates FW update information with the signature attached.

After the FW update information is generated, the server 500 causes the data transmitting and receiving unit 510 to transmit the FW update information (delivery data) (step S1106a). Consequently, the FW update information is transmitted from the server 500 to the gateway 300, and the gateway 300 receives the FW update information (step S1106b).

After receiving the FW update information, the gateway 300 verifies the signature of the FW update information (FW update information signature) with the signature verifying unit 373 (step S1107). Subsequently, the FW update processing unit 370 of the gateway 300 determines whether or not the signature verification is successful (step S1108), and if verification is unsuccessful, discards the FW update information (step S1110). In this case, a firmware update based on the FW update information is not conducted. If the verification is successful, the gateway 300 conducts a FW update control process with the FW update processing unit 370 acting as the agent, in conjunction with the relevant ECU to update (step S1109). The content of the FW update control process will be discussed later.

After finishing the FW update control process in step S1109, or after discarding the FW update information in step S1110, the gateway 300 transmits a firmware update result to the server 500 (step S1111a). The firmware update result is information indicating whether or not the update is successful, for example, and this information may include a FW version related to the firmware after the update, for example. Consequently, the server 500 receives the update result (step S1111b). Note that when a firmware update result is received, the server 500 may update the vehicle ECU management information stored by the ECU management information storing unit 572 to indicate the updated state of the relevant firmware.

1.15 Example FW Update Control Process by Gateway 300

Figure 15:
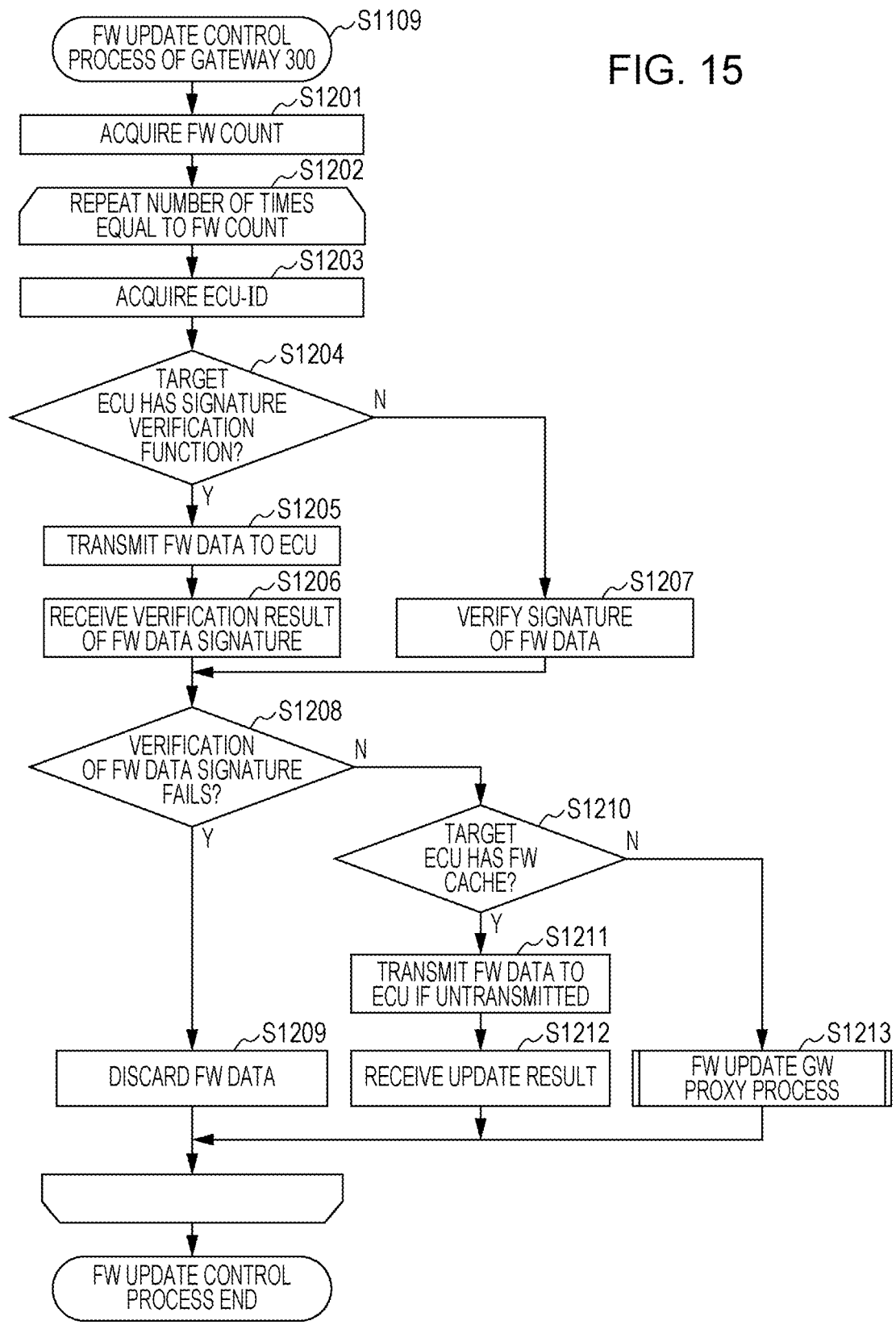
FIG. 15 is a flowchart illustrating an example of a FW update control process by a gateway according to Embodiment 1.

FIG. 15 is a flowchart illustrating an example of the FW update control process by the gateway 300.

Hereinafter, the FW update control process executed by the gateway 300 in the above step S1109 will be described with reference to FIG. 15.

The gateway 300 uses the FW update processing unit 370 to acquire the FW count in the FW update information (see FIG. 13) (step S1201), and repeats the process from step S1203 to step S1213 a number of times equal to the FW count (step S1202).

The FW update processing unit 370 acquires the ECU-ID in the FW data of the FW update information, and specifies the ECU whose firmware is to be updated (step S1203).

Next, in the gateway 300, the FW update processing unit 370 references the list of ECU information stored by the ECU information storing unit 372 (see FIG. 6), and determines whether or not the ECU to update (the ECU identified by the ECU-ID acquired in step S1203) has a signature verification capability (includes the signature verification function) (step S1204).

In the case of determining in step S1204 that the ECU to update includes the signature verification function, the FW update processing unit 370 causes the frame generating unit 380 to generate a frame including the FW data to transmit to the relevant ECU, and the frame transmitting and receiving unit 310 transmits the frame to the ECU via the bus to which the ECU is connected (step S1205). Subsequently, the gateway 300 receives a verification result of the signature for the FW data (FW data signature) from the ECU whose firmware is to be updated (step S1206).

In the case of determining in step S1204 that the ECU to update does not include the signature verification function, the FW update processing unit 370 causes the signature verifying unit 373 to verify the signature for the FW data (FW data signature) (step S1207). In other words, the gateway 300 executes by proxy the verification of the FW data signature for the ECU whose firmware is to be updated.

After step S1206 or step S1207, the gateway 300 determines the FW data signature verification result (step S1208), and if verification fails, discards the FW data (step S1209). On the other hand, if verification succeeds, the FW update processing unit 370 references the list of ECU information stored by the ECU information storing unit 372 (see FIG. 6), and determines whether or not the ECU to update has a FW cache (includes the FW cache function) (step S1210).

In the case of determining in step S1210 that the ECU to update includes the FW cache function, if the FW data has not yet been transmitted to the relevant ECU, the FW update processing unit 370 causes the frame generating unit 380 to generate a frame including the FW data, and the frame transmitting and receiving unit 310 transmits the frame to the ECU via the bus to which the ECU is connected (step S1211). Consequently, the ECU whose firmware is to be updated receives the FW data, conducts a process for updating the firmware, and transmits the update result to the gateway 300. Subsequently, the gateway 300 receives the update result transmitted from the ECU (step S1212).

In the case of determining in step S1210 that the ECU to update does not include the FW cache function, the gateway 300 conducts a FW update GW proxy process in conjunction with the ECU to update (step S1213). This FW update GW proxy process will be described later.

1.16 Example Operations of Firmware Update in ECU 100a

Figure 16:
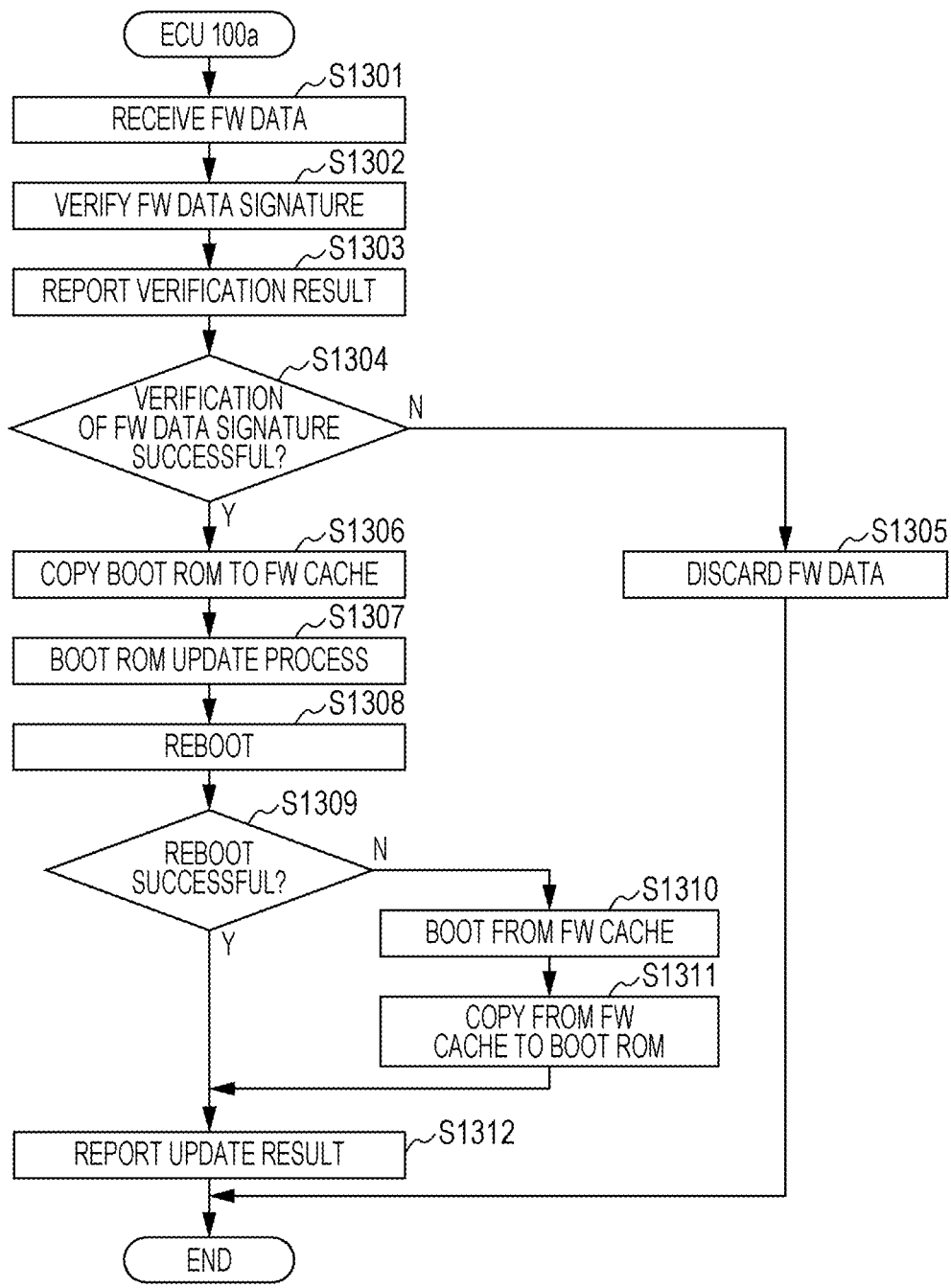
FIG. 16 is a flowchart illustrating an example of a FW update control process by an ECU that includes a signature verification function and a FW cache function according to Embodiment 1.

FIG. 16 is a flowchart illustrating an example of a FW update control process by the ECU 100a that includes the signature verification function and the FW cache function. Hereinafter, the FW update control process conducted by the ECU 100a will be described with reference to FIG. 16.

In the ECU 100a, the frame transmitting and receiving unit 110 receives a frame that includes FW data transmitted from the gateway 300 in the above step S1205 (step S1301).

The FW update processing unit 160 of the ECU 100a acquires FW data from the frame received in step S1301 via the frame interpreting unit 120 and the frame processing unit 150, and causes the signature verifying unit 163 to verify the FW data signature in the FW data (step S1302). Subsequently, the ECU 100a uses the frame transmitting and receiving unit 110 to transmit a frame indicating the verification result of the FW data signature to the bus 200a (step S1303). Consequently, the verification result of the FW data signature is reported to the gateway 300.

The FW update processing unit 160 determines whether or not the verification of the FW data signature is successful (step S1304), and if unsuccessful, discards the FW data (step S1305), and does not conduct the firmware update.

If the verification of the FW data signature is successful, the FW update processing unit 160 saves the firmware, that is, the contents of the boot ROM in the ECU 100a, by copying the firmware to the FW cache storing unit 161 (step S1306).

Next, the FW update processing unit 160 updates the firmware inside the boot ROM with the firmware (FW) in the FW data (step S1307), and reboots by resetting the processor of the ECU 100a (step S1308).

The ECU 100a is preconfigured to boot from the contents of the FW cache storing unit 161 if booting from the boot ROM is unsuccessful, and thus if the reboot in step S1308 is unsuccessful (step S1309), the ECU 100a boots from the pre-update firmware saved in the FW cache storing unit 161 (step S1310). Subsequently, under the control of the pre-update firmware, the pre-update firmware saved in the FW cache storing unit 161 is copied to the boot ROM, thereby reverting the contents of the boot ROM back to the pre-update state (step S1311).

If the reboot in step 31308 is successful, the ECU 100a transmits to the bus 200a a frame including an update result indicating that the firmware update succeeded, whereas if the reboot in step S1308 is unsuccessful, after step S1311, the ECU 100a transmits to the bus 200a a frame including an update result indicating that the firmware update failed (step S1312). Consequently, the firmware update result is reported to the gateway 300.

1.17 Example Operations of Firmware Update in ECU 100b

Figure 17:
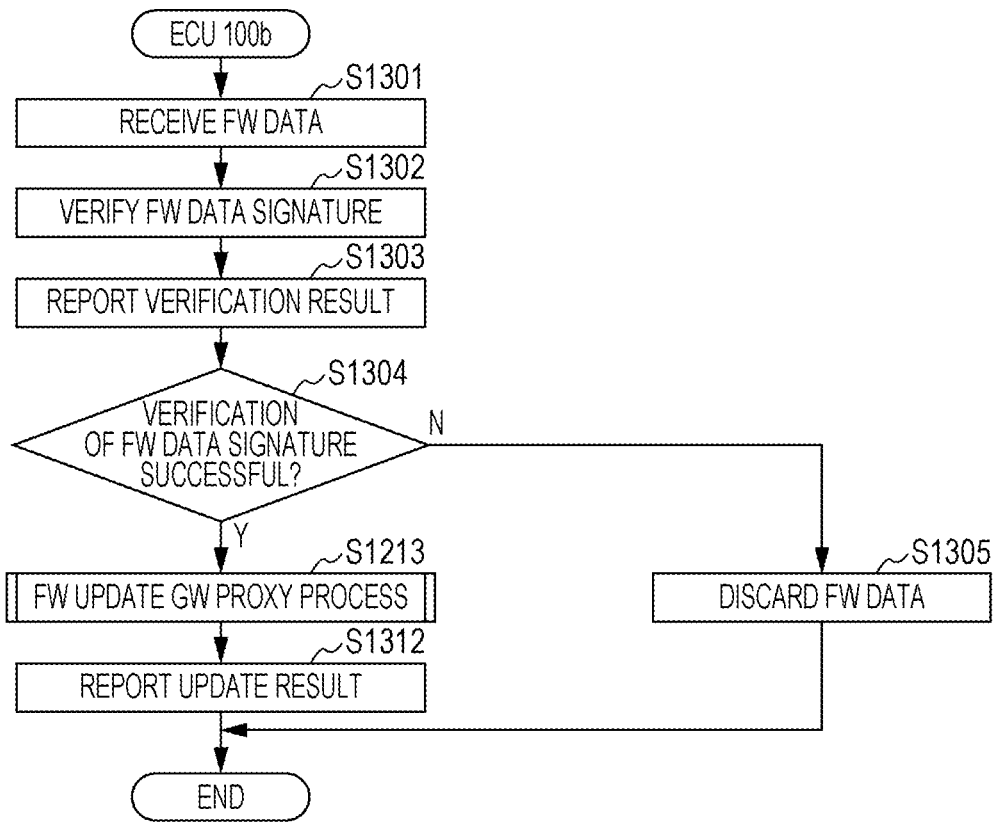
FIG. 17 is a flowchart illustrating an example of a FW update control process by an ECU that includes a signature verification function according to Embodiment 1.

FIG. 17 is a flowchart illustrating an example of a FW update control process by the ECU 100b that includes the signature verification function, but does not include the FW cache function. In the diagram, steps similar to the steps discussed above are denoted with the same signs. Hereinafter, the FW update control process conducted by the ECU 100b will be described with reference to FIG. 17.

In the ECU 100b, the frame transmitting and receiving unit 110 receives a frame that includes FW data transmitted from the gateway 300 in the above step 31205 (step S1301).

The FW update processing unit 165 of the ECU 100b acquires FW data from the frame received in step S1301 via the frame interpreting unit 120 and the frame processing unit 150, and causes the signature verifying unit 163 to verify the FW data signature in the FW data (step S1302). Subsequently, the ECU 100b uses the frame transmitting and receiving unit 110 to transmit a frame indicating the verification result of the FW data signature to the bus 200a (step 31303). Consequently, the verification result of the FW data signature is reported to the gateway 300.

The FW update processing unit 165 determines whether or not the verification of the FW data signature is successful (step S1304), and if unsuccessful, discards the FW data (step 31305), and does not conduct the firmware update.

If the verification of the FW data signature is successful, the ECU 100b conducts the FW update GW proxy process discussed later in conjunction with the gateway 300 (step S1213). The ECU 100b transmits to the bus 200a a frame including the firmware update result according to the FW update GW proxy process (step S1312). Consequently, the firmware update result is reported to the gateway 300.

1.18 Example Operations of Firmware Update in ECU 100c

Figure 18:
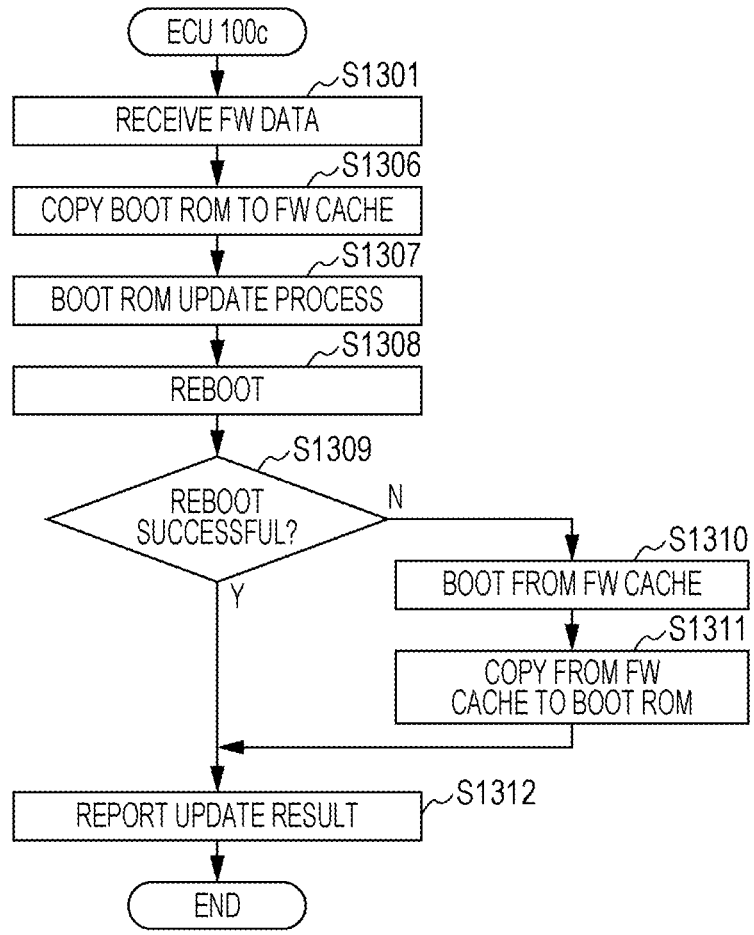
FIG. 18 is a flowchart illustrating an example of a FW update control process by an ECU that includes a FW cache function according to Embodiment 1.

FIG. 18 is a flowchart illustrating an example of a FW update control process by the ECU 100c that does not include the signature verification function, but does include the FW cache function. In the diagram, steps similar to the steps discussed above are denoted with the same signs. Hereinafter, the FW update control process conducted by the ECU 100c will be described with reference to FIG. 18.

In the ECU 100c, the frame transmitting and receiving unit 110 receives a frame that includes FW data transmitted from the gateway 300 in the above step S1211 (step 31301).

The FW update processing unit 166 of the ECU 100c acquires FW data from the frame received in step 31301 via the frame interpreting unit 120 and the frame processing unit 150, and saves the firmware, that is, the contents of the boot ROM in the ECU 100c, by copying the firmware to the FW cache storing unit 161 (step 31306).

Next, the FW update processing unit 166 updates the firmware inside the boot ROM with the firmware (FW) in the FW data (step 31307), and reboots by resetting the processor of the ECU 100c (step S1308).

The ECU 100c is preconfigured to boot from the contents of the FW cache storing unit 161 if booting from the boot ROM is unsuccessful, and thus if the reboot in step S1308 is unsuccessful (step 31309), the ECU 100c boots from the pre-update firmware saved in the FW cache storing unit 161 (step 31310). Subsequently, under the control of the pre-update firmware, the pre-update firmware saved in the FW cache storing unit 161 is copied to the boot ROM, thereby reverting the contents of the boot ROM back to the pre-update state (step 31311).

If the reboot in step 31308 is successful, the ECU 100c transmits to the bus 200b a frame including an update result indicating that the firmware update succeeded, whereas if the reboot in step S1308 is unsuccessful, after step S1311, the ECU 100c transmits to the bus 200b a frame including an update result indicating that the firmware update failed (step S1312). Consequently, the firmware update result is reported to the gateway 300.

1.19 Example Operations of Firmware Update in ECU 100d

Figure 19:
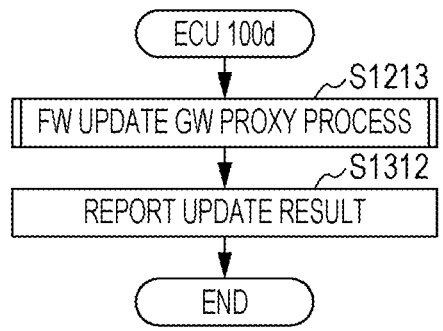
FIG. 19 is a flowchart illustrating an example of a FW update control process by an ECU that does not include a signature verification function and a FWAV cache function according to Embodiment 1.

FIG. 19 is a flowchart illustrating an example of a FW update control process by the ECU 100d that does not include the signature verification function or the FW cache function. In the diagram, steps similar to the steps discussed above are denoted with the same signs.

The ECU 100d conducts the FW update GW proxy process discussed later in conjunction with the gateway 300 (step 31213). The ECU 100d transmits to the bus 200b a frame including the firmware update result according to the FW update GW proxy process (step S1312). Consequently, the firmware update result is reported to the gateway 300.

1.20 FW Update GW Proxy Process in Gateway 300 and ECU

Figure 20:
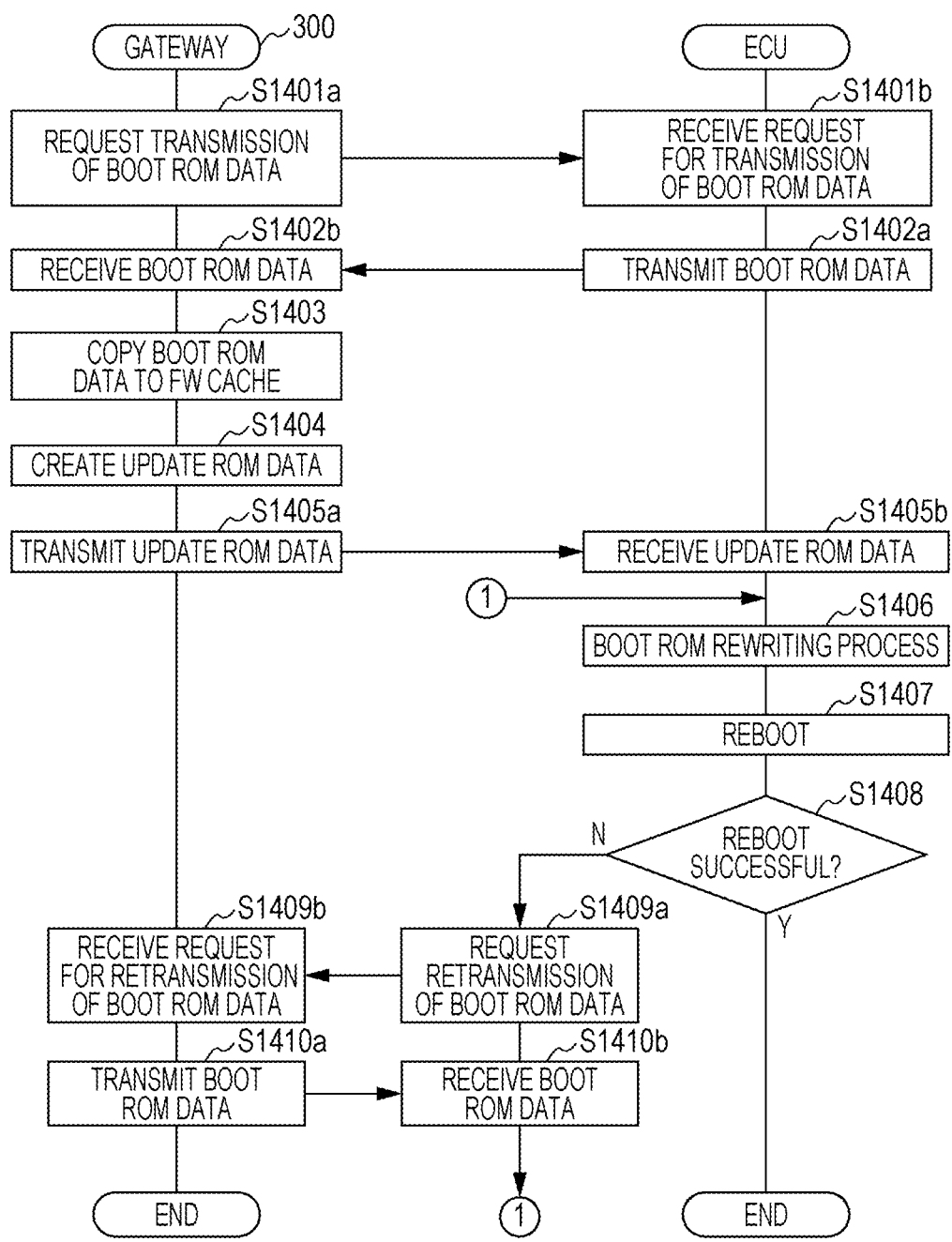
FIG. 20 is a sequence diagram illustrating example operations related to a FW update gateway (GW) proxy process according to Embodiment 1.

Hereinafter, the FW update GW proxy process will be described with reference to FIG. 20. FIG. 20 is a sequence diagram illustrating an example of the FW update GW proxy process in which, when updating the firmware in an ECU (ECU 100b or 100d), the gateway 300 executes part of the process by proxy.

First, the gateway 300 requests the ECU whose firmware is to be updated, but which does not include the FW cache function, to transmit boot ROM data (the pre-update firmware inside the boot ROM) (step S1401a).

The ECU receives the request from the gateway 300 (step S1401b), and transmits the boot ROM data (the firmware inside the boot ROM) of that ECU (step S1402a).

The gateway 300 receives the boot ROM data from the ECU (step S1402b), stores a copy in the FW cache storing unit 371 (step 31403), and creates update ROM data (for example, updated data obtained by applying the firmware of the FW data used for updating to the pre-update firmware) (step S1404).

Next, the gateway 300 transmits the created update ROM data (step S1405a), and the ECU whose firmware is to be updated receives the update ROM data (step S1405b).

The ECU receiving the update ROM data updates the data inside the boot ROM with the update ROM data (step S1406), and reboots by resetting the processor of the ECU (step S1407). Note that when rebooting, the ECU is preconfigured to request retransmission of the boot ROM data if booting from the boot ROM is unsuccessful, and if the reboot in step S1407 is unsuccessful (step S1408), requests retransmission of the boot ROM data (step S1409a).

Correspondingly, when the gateway 300 receives the request for retransmission of the boot ROM data (step S1409b), the gateway 300 transmits the boot ROM data stored in the FW cache storing unit 371 (step S1410a). Consequently, the ECU receives the boot ROM data (step S1410b), updates the data inside the boot ROM with the boot ROM data (step S1406), reverts back to the original firmware, and reboots (step S1407). In step S1408, if the reboot is successful, the ECU ends the firmware update process.

1.21 Advantageous Effects of Embodiment 1

In the in-vehicle network system 10 according to Embodiment 1, if an ECU whose firmware is to be updated from among the ECUs connected to the in-vehicle network (buses 200a and 200b) does not include a function for updating (signature verification function, FW cache function), the gateway 300 conducts (executes by proxy) a process related to the function instead of that ECU.

Consequently, it becomes possible to update firmware safely, even for an ECU that does not have the functions necessary to conduct a secure firmware update.

Embodiment 2

Hereinafter, an in-vehicle network system 20, which is a partial modification of the in-vehicle network system 10 indicated in Embodiment 1, will be described.

In the in-vehicle network system 20 according to the present embodiment, the firmware update method is used so that when an ECU conducts a firmware update, if the ECU to update is unable to execute a process necessary for conducting a suitable firmware update safely (such as the signature verification process, for example), the gateway device and another ECU execute the process by proxy. Consequently, a suitable firmware update becomes possible, even for an ECU that does not include the function of executing the process necessary for the firmware update or the like, or an ECU that is in a state of being unable to execute such a function. Regarding points not described particularly in the present embodiment, the in-vehicle network system 20 is similar to the in-vehicle network system 10.

2.1 Overall Configuration of In-Vehicle Network System 20

Figure 21:
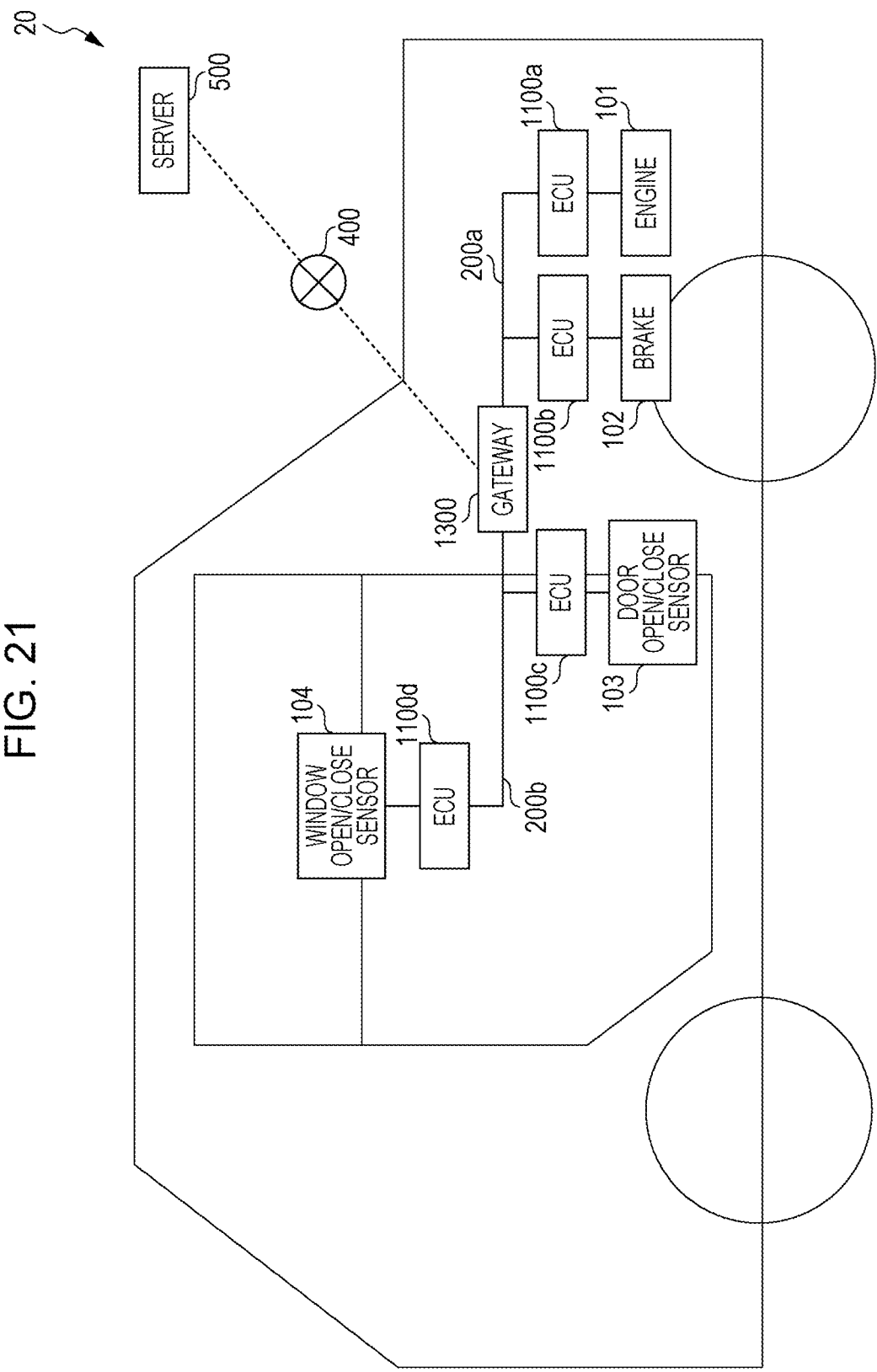
FIG. 21 is a diagram illustrating an overall configuration of an in-vehicle network system according to Embodiment 2.

FIG. 21 is a diagram illustrating an overall configuration of the in-vehicle network system 20 according to Embodiment 2.

As illustrated in FIG. 21, the in-vehicle network system 20 is configured to include ECUs 1100*a* to 110*d* connected to various equipment on-board the vehicle, buses 200*a* and 200*b*, a gateway 1300, as well as a network 400 and a server 500 outside the vehicle. Note that although the in-vehicle network system 20 may include any number of ECUs other than the gateway 1300 and the ECUs 1100*a* to 1100*d*, the description herein will focus on the gateway 1300 and the ECUs 1100*a* to 1100*d* for the sake of convenience. In FIG. 21, structural elements similar to the in-vehicle network system 10 illustrated in Embodiment 1 are denoted with the same signs as in FIG. 1, and the description thereof will be reduced or omitted herein.

The ECUs 1100*a* to 1100*d* are connected to equipment such as an engine 101, a brake 102, a door open/close sensor 103, and a window open/close sensor 104, respectively, acquiring the respective states of the equipment and periodically transmitting frames indicating the states (data frames) to an in-vehicle network made up of devices such as the buses 200*a* and 200*b*. Note that the ECU information regarding the ECUs 1100*a* to 1100*d* is similar to that illustrated in FIG. 6, for example.

The gateway 1300 is a type of ECU that acts as a gateway device connecting the bus 200*a*, to which the ECU 1100*a* and the ECU 1100*b* are connected, and the bus 200*b*, to which the ECU 1100*c* and the ECU 1100*d* are connected. The gateway 1300 is a partial modification of the gateway 300 illustrated in Embodiment 1, and includes a function of executing by proxy a process for updating the firmware of a certain ECU, in conjunction with an ECU other than the certain ECU. The functional configuration of the gateway 1300 is similar to the configuration of the gateway 300 illustrated in FIG. 3. Note that the FW update processing unit 370 in the gateway 1300 functions as a control unit that determines, based on information about the ECU on which to apply the updated firmware (the ECU to update), whether or not the ECU satisfies a certain condition (a condition such as including the signature verification function and including the FW cache function), and if the certain condition is satisfied, causes the relevant ECU to execute a certain process related to the firmware update (such as a process of signature verification and a process related to the FW cache function), whereas if the certain condition is not satisfied, performs control so that the certain process is executed by a component other than the relevant ECU (namely, a selected proxy ECU). Also, similarly to the gateway 300, the gateway 1300 includes a function of forwarding a frame received from one bus to the other bus, and also includes a function of communicating with the server 500 via the network 400. The server 500 includes a function of delivering FW update information, which is data for updating the firmware of the ECUs 1100*a* to 1100*d*.

2.2 Example FW Update Control Process by Gateway 1300

In the in-vehicle network system 20, similarly to the in-vehicle network system 10, FW update information is delivered from the server 500, and an ECU conducts a firmware update under the control of the gateway 1300 (see FIG. 14).

Figure 22:
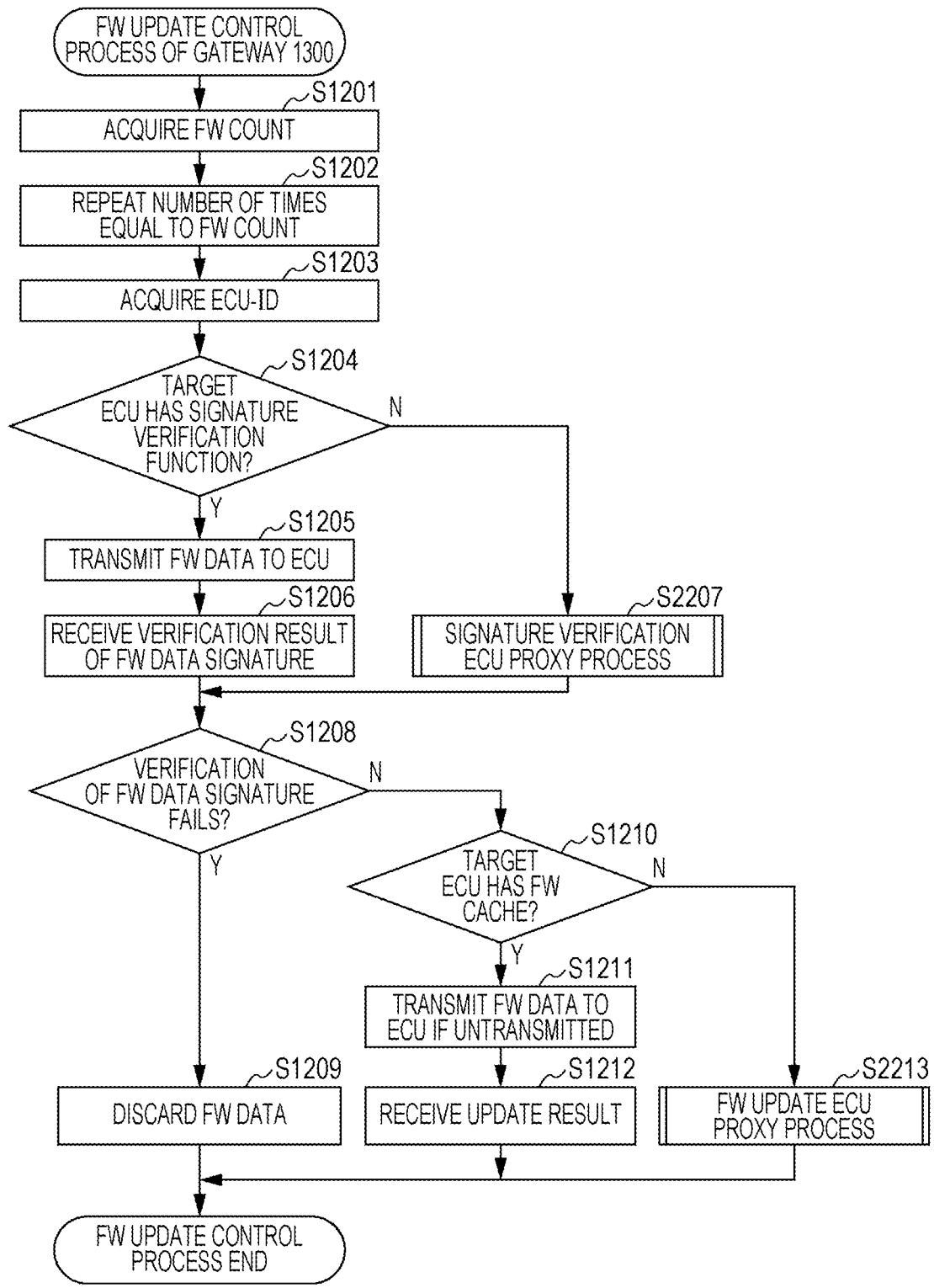
FIG. 22 is a flowchart illustrating an example of a FW update control process by a gateway according to Embodiment 2.

FIG. 22 is a flowchart illustrating an example of the FW update control process by the gateway 1300. This FW update control process is a process that corresponds to step S1109 in FIG. 14, which is executed by the gateway 1300 after receiving FW update information delivered from the server 500. Note that steps similar to the FW update control process of Embodiment 1 (see FIG. 15) are denoted in FIG. 22 with the same signs as FIG. 15, and the description thereof will be reduced or omitted as appropriate.

The gateway 1300 uses the FW update processing unit 370 to acquire the FW count in the FW update information (see FIG. 13) (step S1201), and repeats the processes from step S1203 to step S1212, step S2207, step S2213, and the like a number of times equal to the FW/V count (step S1202).

The gateway 1300 specifies the ECU whose firmware is to be updated from the ECU-ID of the FW data in the FW update information in step 31203, references the list of ECU information stored by the ECU information storing unit 372 (see FIG. 6), and determines whether or not the ECU to update includes the signature verification function (step S1204).

In the case of determining in step S1204 that the ECU to update does not include the signature verification function, the gateway 1300 conducts the signature verification ECU proxy process discussed later (step S2207). According to the signature verification ECU proxy process, the gateway 1300 causes another ECU to execute by proxy the verification of the FW data signature for the ECU whose firmware is to be updated.

After step S1206 or step S2207, the gateway 1300 determines the FW data signature verification result (step S1208), and if verification fails, discards the FW data (step S1209). On the other hand, if verification succeeds, the gateway 1300 references the list of ECU information (see FIG. 6), and determines whether or not the ECU to update has a FW cache (includes the FW cache function) (step S1210).

In the case of determining in step S1210 that the ECU to update does not include the FW cache function, the gateway 1300 conducts the FW update ECU proxy process discussed later (step S2213).

2.3 Signature Verification ECU Proxy Process Example

Figure 23:
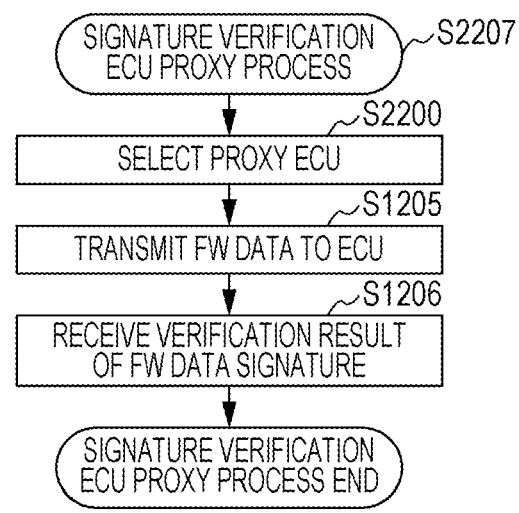
FIG. 23 is a flowchart illustrating an example of a signature verification ECU proxy process by a gateway according to Embodiment 2.

FIG. 23 is a flowchart illustrating an example of the signature verification ECU proxy process by the gateway 1300.

The gateway 1300, based on the list of ECU information stored by the ECU information storing unit 372 (see FIG. 6), selects an ECU which is different from the ECU whose firmware is to be updated, and which includes a function of executing a process related to the firmware update, as the ECU to execute that process by proxy (proxy ECU) (step S2200). Specifically, in the signature verification ECU proxy process, an ECU that includes the signature verification function (for example, an ECU that includes a key used to verify a signature) is selected as the proxy ECU to execute by proxy a process related to the signature verification function.

In the gateway 1300, the FW update processing unit 370 causes the frame generating unit 380 to generate a frame including the FW data to transmit to the proxy ECU selected in step S2200, and the frame transmitting and receiving unit 310 transmits the frame to the proxy ECU via the bus to which the proxy ECU is connected (step S1205). Subsequently, the gateway 1300 receives a verification result of the signature for the FW data (FW data signature) from the proxy ECU (step S1206).

2.4 Example of FW Update ECU Proxy Process in Gateway 1300 and ECUs

Figure 24:
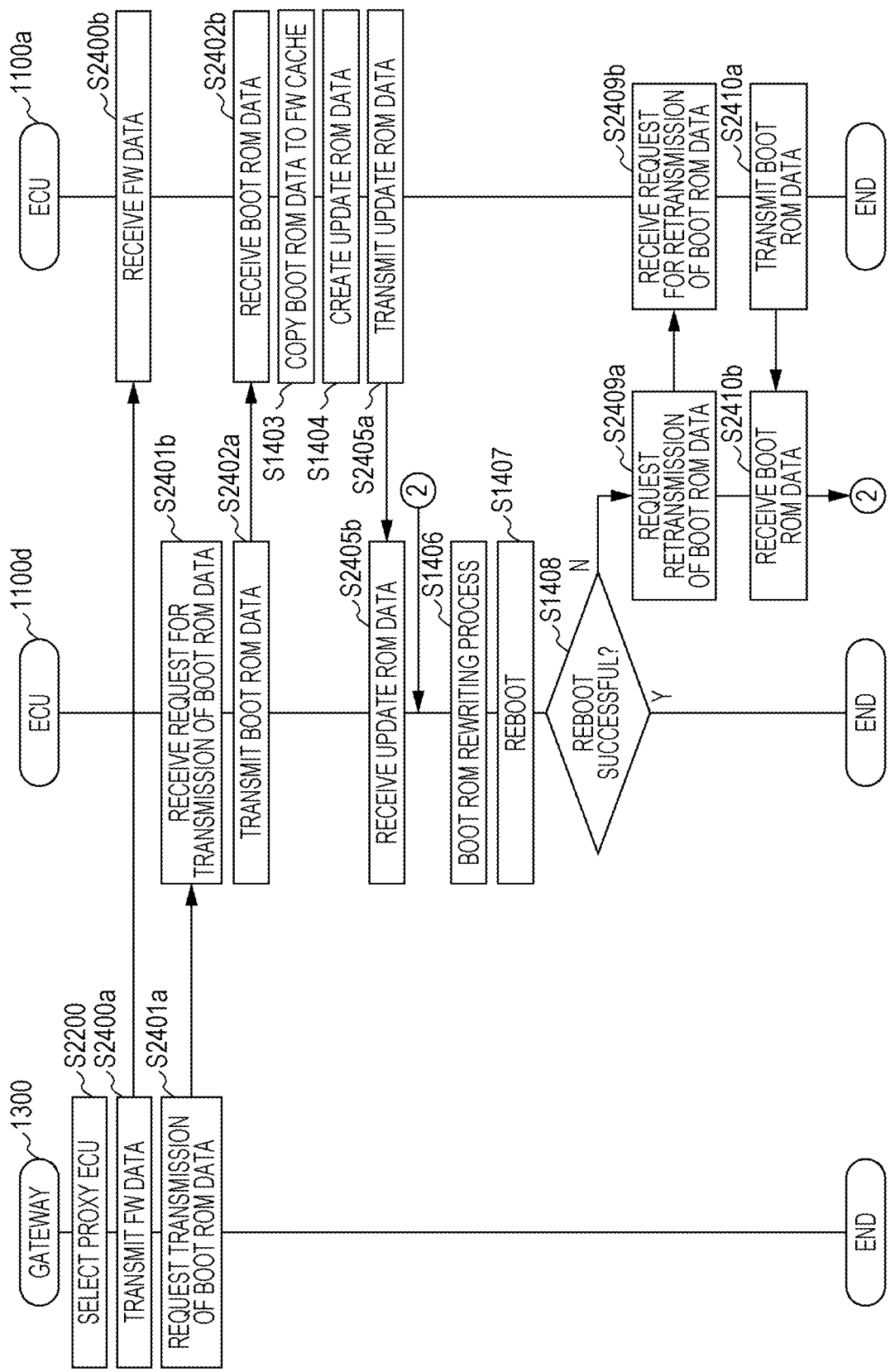
FIG. 24 is a sequence diagram illustrating example operations related to an ECU proxy process for FW update according to Embodiment 2.

FIG. 24 is a sequence diagram illustrating an example of a FW update ECU proxy process by the gateway 1300 and ECUs (the ECUs 1100a and 1100d). The example in the diagram illustrates an example in which the ECU 1100a executes the FW cache function by proxy instead of the ECU 1100d that does not include the FW cache function, Note that steps similar to the steps illustrated in FIG. 20 in Embodiment 1 are also denoted in FIG. 24 with the same signs, and the description thereof will be reduced or omitted as appropriate.

The gateway 1300, based on the list of ECU information stored by the ECU information storing unit 372 (see FIG. 6), selects an ECU which is different from the ECU whose firmware is to be updated, and which includes a function of executing a process related to the firmware update, as the ECU to execute that process by proxy (proxy ECU) (step S2200). Specifically, in the FW update ECU proxy process, the ECU 1100a that includes the FW cache function is selected as the proxy ECU to execute by proxy a process related to the FW cache function.

Next, the gateway 1300 transmits FW data via the bus 200a to the ECU 1100a acting as the proxy ECU to execute by proxy the FW cache function for the ECU 1100d whose firmware is to be updated (step S2400a). The ECU 1100a receives the FW data (step S2400b), recognizes that the ECU 1100a itself is to function as a proxy ECU regarding the FW cache function, and waits to receive boot ROM data.

Next, the gateway 1300 requests the ECU 1100d whose firmware is to be updated, but which does not include the FW cache function, to transmit boot ROM data (the pre-update firmware inside the boot ROM) (step S2401a). The ECU 1100d to be updated receives the request from the gateway 1300 (step S2401b), and transmits the boot ROM data (the firmware inside the boot ROM) of the ECU 1100d (step S2402a). The boot ROM data (the firmware inside the boot ROM) transmitted from the ECU 1100d to the bus 200b is forwarded by the gateway 1300, and received by the ECU 1100a via the bus 200a (step S2402b). Note that in FIG. 24, the process of forwarding frames between buses by the gateway 1300 is omitted, and hereinafter, description regarding the forwarding of frames between buses may be reduced or omitted.

The ECU 1100a receives the boot ROM data from the ECU 1100d (step S2402b), stores a copy in the FW cache storing unit 371 (step S1403), and creates update ROM data based on the boot ROM data and the FW data (step S1404).

Next, the ECU 1100a transmits the created update ROM data (step S2405a), and the ECU 1100d receives the update ROM data (step S2405b).

The ECU 1100d receiving the update ROM data updates the data inside the boot ROM with the update ROM data (step S1406), and reboots by resetting the processor of the ECU 1100d (step S1407). Note that when rebooting, the ECU 1100d is preconfigured to request retransmission of the boot ROM data if booting from the boot ROM is unsuccessful, and if the reboot in step S1407 is unsuccessful (step S1408), requests retransmission of the boot ROM data (step S2409a). Correspondingly, when the ECU 1100a receives the request for retransmission of the boot ROM data (step S2409b), the ECU 1100a transmits the boot ROM data stored in the FW cache storing unit 371 (step S2410a).

Consequently, the ECU 1100d receives the boot ROM data (step S2410b), updates the data inside the boot ROM with the boot ROM data (step S1406), reverts back to the original firmware, and reboots (step S1407). In step S1408, if the reboot is successful, the ECU 1100d ends the firmware update process.

2.5 Advantageous Effects of Embodiment 2

In the in-vehicle network system 20 according to Embodiment 2, if an ECU whose firmware is to be updated from among the ECUs connected to the in-vehicle network (buses 200a and 200b) does not include a function for updating (signature verification function, FW cache function), the gateway 1300 selects another ECU capable of executing by proxy a process related to the function, and causes the other ECU to execute the process by proxy instead of the ECU to update. Consequently, ECU resources are utilized effectively, and it becomes possible to update firmware safely, even for an ECU that does not have the functions necessary to conduct a secure firmware update. Furthermore, it is no longer necessary for the gateway 1300 itself to have proxy execution capabilities, which is useful from a cost reduction standpoint.

Other Embodiments

The above thus describes Embodiments 1 and 2 as illustrative examples of technology according to the present disclosure. However, the technology according to the present disclosure is not limited thereto, and is also applicable to embodiments obtained by the appropriate modification, substitution, addition, or removal of elements. For example, modifications like the following are also included as modes of the present disclosure.

(1) The ECUs such as the ECUs 100a to 100d and 1100a to 1100d illustrated in the above embodiments are taken as an example to be devices including components like digital circuits, such as a processor and memory, analog circuits, and communication circuits, but may also include other hardware structural elements, such as a hard disk device, a display, a keyboard, and a mouse. Additionally, instead of realizing functions in software by having a processor execute a control program stored in memory, such functions may also be realized by special-purpose hardware (such as digital circuits).

Figure 25:
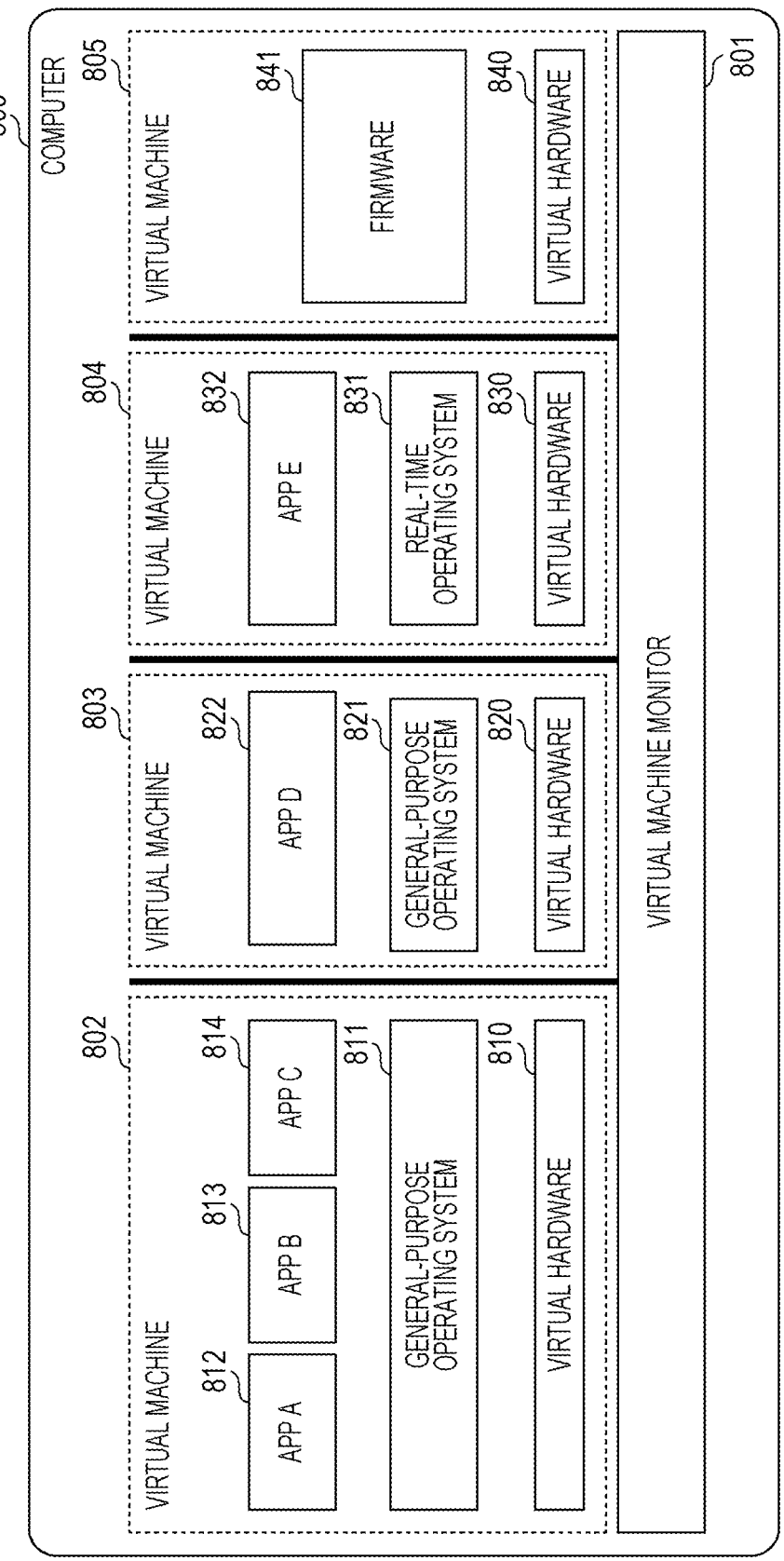
FIG. 25 is a diagram illustrating an example of a software configuration of a virtual environment realized by a computer as an example configuration of an ECU.

Additionally, among ECUs such as the ECUs 100a to 100d and 1100a to 1100d, multiple ECUs may also be realized by a virtual environment constructed by a single physical device (computer) or the like. FIG. 25 is a diagram illustrating an example of a software configuration of a virtual environment realized by a computer 800 as an example configuration of an ECU.

As illustrated in the diagram, the software running on the computer 800 includes a virtual machine monitor 801, virtual machines 802, 803, 804, and 805, virtual hardware 810, 820, 830, and 840, a general-purpose operating system (OS) 811 and 821, a real-time operating system (RTOS) 831, firmware 841, and application programs (apps) app A 812, app B 813, app C 814, app D 822, and app E 832.

The computer 800 is a computer that executes software (such as the virtual machine monitor 801) on a processor. The virtual machine monitor 801 includes functions such as a virtual machine control function that controls the virtual machines 802 to 805 to run independently of each other, a resource management function that manages the allocation of hardware resources, such as memory and CPU, to the virtual machines, a device access function that accesses devices according to requests from the virtual machines, and a scheduling function that schedules the virtual machines. Each of the virtual machines 802 to 805 is configured to include virtual hardware, an OS, apps, or firmware, and each is executed independently by the virtual machine monitor 801. The virtual hardware 810, 820, 830, and 840 provides hardware functions virtually to each of the virtual machines, and may also include an initial program loader (IPL) and a basic input/output system (BIOS). The general-purpose OS 811 includes a function of loading into memory and executing apps (app A 812, app B 813, and app C 814), or a function of removing (unloading) each of the apps from memory, and also provides each of the apps with a network communication function according to the CAN protocol. The general-purpose OS 821 is also similar. The RTOS 831 is an OS for running apps in which real-time performance is important. The app A 812, app B 813, app C 814, app D 822, and app E 832 include various types of automotive functions, such as car navigation functions, drive assist functions, steering control functions, engine control functions, brake control functions, and sensor information (such as torque, angle, velocity, and RPM) acquisition functions. Each of these automotive function groups may be executed by a single app, or may be executed by multiple apps. The firmware 841 is software for running functions that do not require an OS, or the like. Note that the firmware 841 may also include an OS, or include a function of becoming the operating environment of another app and controlling the execution of the other app. Note that the number of apps running on the general-purpose OS 811, 821 or the RTOS 831 illustrated in FIG. 25 is merely one example, and a greater number of apps may also be run. In addition, the diagram illustrates a case in which there are two virtual machines on which a general-purpose OS is running, one virtual machine on which an RTOS is running, and one virtual machine on which firmware is running, but this is merely one example. A virtual environment may also be configured with just a virtual machine on which firmware is running, or may be configured with just a virtual machine on which firmware is running and a virtual machine on which an RTOS is running.

In the computer 800, multiple ECUs constituting some or all of the ECUs 100a to 100d and 1100a to 1100d are realized by a single virtual machine, respectively, such as the virtual machines 802 to 805 discussed above. For example, multiple virtual machines 805 (equal to the number of ECUs constituting the operating environment) may be generated and made to run on the virtual machine monitor 801, in which the hardware operation of a single ECU is realized by the virtual hardware 840 of each virtual machine 805, and the firmware 841 has the same contents as the firmware implemented in that ECU, for example. For example, the virtual machine monitor 801 may be configured to realize the bus-mediated communication between ECUs by communicating between the multiple virtual hardware configurations running on the virtual machine monitor 801.

(2) In the above embodiments, the gateway 300 or 1300 that includes the external communication unit 375 (external communication function) communicates with the server 500 over the network 400 external to the vehicle, but this is merely one example. For example, the gateway 300 or 1300 may also communicate with the server 500 via a separate ECU (such as a head unit, for example) having a function of communicating with external equipment. The head unit is a type of ECU provided with a comparatively powerful processor, and is a device that includes a display device such as a liquid crystal display provided on the instrument panel (IP) of an automobile, and may report information to the driver of the vehicle. Note that some in-vehicle networks have a diagnostic port called On-Board Diagnostics 2 (OBD2) or the like, which is an interface that communicates with an external device such as a diagnostic tool, and which is used to diagnose ECUs. Accordingly, the gateway 300 or 1300 may also communicate with an external device which is able to communicate with the server 500 and which is also connected to the diagnostic port, and thereby communicate with the server 500 indirectly, for example. In these cases, the gateway 300 or 1300 does not necessarily need to include an external communication function for communicating with equipment external to the vehicle, and the exchange of FW update information or the like becomes possible between the gateway 300 or 1300 and the server 500 via another ECU or an external device. Additionally, the gateway 300 or 1300 may also acquire FW update information stored in an external storage medium (such as non-volatile memory) connected to the gateway itself or another ECU.

(3) In the above embodiments, an in-vehicle network is illustrated as an example of a network communication system that communicates in accordance with the CAN protocol. The technology according to the present disclosure is not limited to an in-vehicle network, and is also applicable to network communication systems that communicate according to the CAN protocol besides an in-vehicle network, such as a network for a robot, industrial equipment, or the like. Also, the CAN protocol should be construed in a broad sense, and also encompasses derivative protocols such as CANopen used in embedded systems inside automation systems, time-triggered CAN (TTCAN), and CAN with flexible data rate (CANFD). Also, the above embodiments illustrate an example of transmitting and receiving data (frames) related to firmware between buses based on the CAN protocol, but another protocol may also be applied, and an arbitrary communication link and communication scheme may be used to communicate data related to firmware.

(4) In the above embodiments, to ensure the integrity of data (such as FW data and FW update information), a configuration in which a signature is attached to the data is used, but the data additionally may be encrypted to ensure confidentiality. The key used for the signature and the key used for the encryption may also be separate keys.

(5) In the above embodiments, the same key is used when generating the signature for the FW update information and when generating the signature for the FW data, but a separate key for each may also be used. For example, the signature for the FW update information as the delivery data as a whole (FW update information signature) may be generated using a key held by the automobile manufacturer, whereas the signature for the individual FW data (FW data signature) may be generated used a key held by the manufacturing company of the ECU implementing the firmware according to that FW data (or alternatively, the manufacturing company of that firmware). Correspondingly, to enable the gateway 300 to execute by proxy the signature verification for the ECU, the gateway 300 is configured to store in advance the necessary keys. In addition, in the server 500, if the key used for a FW data signature is a key determined by each manufacturing company of the ECU implementing the firmware, the gateway 1300 may select, based on the list of ECU information (see FIG. 6) an ECU from the same manufacturing company as the ECU whose firmware is to be updated (that is, an ECU storing the key needed for the signature verification of that manufacturing company) to act as the proxy ECU. Also, the ECU information may be made to include information about whether or not an ECU has a function of executing the signature verification function by proxy (whether or not the ECU includes a key for executing signature verification by proxy for firmware other than that of the ECU itself), and the gateway 1300 may select a proxy ECU based on this information.

(6) The above embodiments illustrate that the gateway 300 or 1300 determines, based on the list of ECU information stored by the ECU information storing unit 372, whether to perform control causing an ECU other than the ECU to update or the gateway itself to execute a process for the ECU whose firmware is to be updated, or cause the ECU to update to execute the process (in other words, the gateway 300 or 1300 determines whether or not execution by proxy is necessary). This determination of whether or not execution by proxy is necessary (the determination of whether or not the ECU to update satisfies a certain condition) may be made based on information indicating the processing capabilities of each ECU (for example, whether or not each ECU includes a function of executing a certain process). If the certain condition is not satisfied, execution by proxy is necessary. Whether or not an ECU includes a function of executing a certain process may be, for example, whether or not the ECU includes the signature verification function and/or the FW cache function. The FW update processing unit 370 (control unit) of the gateway 300 or 1300 may determine that the certain condition is satisfied if the ECU on which to apply the updated firmware (in other words, the ECU to update) includes a function of executing a certain process, and determine that the certain condition is not satisfied if the ECU to update does not include the function of executing the certain process. The information indicating the processing capabilities of an ECU may be information indicating the presence or absence of the signature verification function and/or the FW cache function, as well as information about features such as the memory capacity and processing power of the ECU. Additionally, the gateway 300 or 1300 may make the determination based on factors such as the conditions of the communication load on the in-vehicle network and the conditions of the load on the processor of the ECU. For example, even if the ECU has the processing capabilities, in a situation in which the processor load is higher than a certain degree, the gateway 300 or 1300 may determine that execution by proxy is necessary.

(7) The updated firmware (binary data) illustrated in the above embodiments may be all or part of the firmware to be implemented in the ECU. In the case in which the updated firmware is part of the firmware to be implemented in the ECU, part of the existing firmware inside the ECU is overwritten. In this case, the updated firmware may be configured to include patch data (binary data), and information indicating where to apply the patch (such as address information, for example), In this case, the patch data and the existing firmware first may be merged in the gateway 300, the ECU to update, or the proxy ECU, and then used to replace the firmware in the boot ROM of the ECU.

(8) The execution order of the steps in the various processes illustrated in the above embodiments (such as the steps illustrated in FIGS. 14 to 20 and FIGS. 22 to 24, for example) is not necessarily limited to the order given above, and within a scope that does not depart from the gist of the disclosure, it is possible to rearrange the execution order, perform multiple steps in parallel, or skip some steps.

(9) Some or all of the structural elements constituting each device in the above embodiments may also be configured as a single system large-scale integration (LSI) chip. A system LSI chip is a multi-function LSI chip fabricated by integrating multiple components onto a single chip, and specifically is a computer system including a microprocessor, ROM, RAM, and the like. A computer program is recorded in the RAM. The system LSI chip achieves the functions thereof as a result of the microprocessor operating in accordance with the computer program. In addition, the respective units of the structural elements constituting each of the above devices may be realized individually as separate chips, or as a single chip that includes some or all structural elements. Also, although system LSI is discussed herein, the circuit integration methodology may also be referred to as IC, LSI, super LSI, or ultra LSI, depending on the degree of integration. Furthermore, the circuit integration methodology is not limited to LSI, and may be also be realized with special-purpose circuits or general-purpose processors. A field-programmable gate array (FPGA) capable of being programmed after LSI fabrication, or a reconfigurable processor whose internal LSI circuit cell connections and settings may be reconfigured, may also be used. Furthermore, if circuit integration technology that may be substituted for LSI appears as a result of progress in semiconductor technology or another derived technology, obviously the new technology may be used to integrate the function blocks. Biotechnology applications and the like are also a possibility.

(10) Some or all of the structural elements constituting each of the above devices may also be configured as an IC card or a separate module that may be inserted into each device. The IC card or the module is a computer system made up of components such as a microprocessor, ROM, and RAM. The IC card or the module may also include the advanced multi-function LSI chip discussed above. The IC card or the module achieves the functions thereof as a result of the microprocessor operating in accordance with the computer program. The IC card or the module may also be tamper-resistant.

(11) One aspect of the present disclosure may be a firmware update method that includes all or part of the processing steps illustrated in FIGS. 14 to 20 and FIGS. 22 to 24, for example. The firmware update method includes a receiving step of receiving FW update information including updated firmware from an external device external to the vehicle, such as step S1106*b*, for example. In addition, the firmware update method includes a controlling step of determining whether or not the ECU whose firmware is to be updated satisfies a certain condition, and if the certain condition is satisfied, causing the ECU to execute a certain process related to the firmware update, whereas if the certain condition is not satisfied, causing the certain process to be executed by equipment other than the ECU, such as steps S1204 to S1207 or steps S1210 to 31213, for example. In addition, this method may be taken to be a computer program (control program) realized by a computer, or a digital signal containing the computer program. For example, the computer program may be a control program for executing a firmware update process including the receiving step and the controlling step in the firmware update method. In addition, one aspect of the present disclosure may be realized by recording the computer program or the digital signal onto a computer-readable recording medium, such as a flexible disk, hard disk, CD-ROM, MO, DVD, DVD-ROM, DVD-RAM, Blu-ray (registered trademark) Disc (BD), or semiconductor memory, for example. In addition, one aspect of the present disclosure may also be taken to be the digital signal recorded on these recording media. In addition, one aspect of the present disclosure may also be realized by transmitting the computer program or the digital signal over an electrical communication link, a wired or wireless communication link, a network such as the Internet, or a data broadcast. In addition, one aspect of the present disclosure may also be a computer system equipped with a microprocessor and memory, in which the memory records the above computer program, and the microprocessor operates according to the computer program. In addition, one aspect of the present disclosure may also be carried out by another independent computer system by recording and transporting the program or the digital signal on a recording medium, or transporting the program or the digital signal over a medium such as a network.

(12) Embodiments realized by arbitrarily combining the respective structural elements and functions indicated in the above embodiments and the above modifications are also included in the scope of the present disclosure.

The present disclosure is usable to suitably conduct a firmware update on an ECU connected to an in-vehicle network.

The invention claimed is:

1. A gateway device connected via one or more networks to a plurality of electronic controllers on-board a vehicle, the gateway device comprising:
one or more memories; and
circuitry, that in operation,
acquires firmware update information, the firmware update information including updated firmware to be applied to a first electronic controller from among the plurality of electronic controllers on-board the vehicle,
determines, by accessing the one or more memories, whether or not the first electronic controller satisfies a second condition based on second information about the first electronic controller, wherein the second information is whether the first electronic controller includes a firmware cache for performing a pre-update firmware cache operation, and
causes, when the second condition is determined not to be satisfied, the gateway device to execute a proxy process,
wherein the gateway device requests the first electronic controller to transmit boot ROM data to the gateway device, creates updated boot ROM data with the updated firmware, and transmits the updated boot ROM data to the first electronic controller that updates the boot ROM and resets the first electronic controller with the updated firmware, and
at least one of the plurality of electronic controllers is implemented in a virtual machine.

2. The gateway device according to claim 1,
wherein each of the plurality of electronic controllers is implemented in a virtual machine.

3. The gateway device according to claim 1,
the circuitry, that further in operation,
determines, by accessing the one or more memories, whether or not the first electronic controller satisfies a first condition based on first information about the first electronic controller, wherein the first information is whether the first electronic controller is capable of performing a signature verification operation, which is determined prior to transmittal of the updated firmware,
causes, when the first condition is determined to be satisfied, the first electronic controller to execute a first process related to updating the firmware of the first electronic controller, and
causes, when the first condition is determined not to be satisfied, a first device on-board the vehicle, other than the first electronic controller, to execute the first process related to updating the firmware of the first electronic controller by proxy.

4. The gateway device according to claim 3,
wherein the first information indicates a processing capability of the first electronic controller.

5. The gateway device according to claim 3,
wherein the first information indicates whether or not the first electronic controller includes a function of executing the first process, and
in the determining, the first condition is determined to be satisfied when the first electronic controller includes the function of executing the first process, and the first condition is determined not to be satisfied when the first electronic controller does not include the function of executing the first process.

6. The gateway device according to claim 3,
wherein the firmware update information includes a signature attached to the updated firmware, and
the first process is a process of verifying the signature.

7. The gateway device according to claim 6,
wherein when the first condition is determined not to be satisfied, the circuitry selects, as the first device, an electronic controller that is other than the first electronic controller and that includes a key to use for verifying the signature from among the plurality of electronic controllers.

8. The gateway device according to claim 3,
wherein the first process is a process of saving pre-update firmware held by the first electronic controller.

9. The gateway device according to claim 3,
wherein when the first condition is determined not to be satisfied, the circuitry selects, as the first device, a second electronic controller other than the first electronic controller from among the plurality of electronic controllers.

10. The gateway device according to claim 3,
wherein when the first condition is determined not to be satisfied, the circuitry selects the gateway device as the first device.

11. The gateway device according to claim 1,
wherein the plurality of electronic controllers communicate over the one or more networks in accordance with a controller area network (CAN) protocol.

12. An in-vehicle network system provided with a plurality of electronic controllers on-board a vehicle that communicate over one or more networks, and a gateway device connected to the one or more networks, the gateway device comprising:
one or more memories; and
circuitry, that in operation,
acquires firmware update information, the firmware update information including updated firmware to be applied to a first electronic controller from among the plurality of electronic controllers on-board the vehicle,
determines, by accessing the one or more memories, whether or not the first electronic controller satisfies a second condition based on second information about the first electronic controller, wherein the second information is whether the first electronic controller includes a firmware cache for performing a pre-update firmware cache operation, and
causes, when the second condition is determined not to be satisfied, the gateway device to execute a proxy process,
wherein the gateway device requests the first electronic controller to transmit boot ROM data to the gateway device, creates updated boot ROM data with the updated firmware, and transmits the updated boot ROM data to the first electronic controller that updates the boot ROM and resets the first electronic controller with the updated firmware, and
at least one of the plurality of electronic controllers is implemented in a virtual machine.

13. A method used in an in-vehicle network system provided with a plurality of electronic controllers on-board a vehicle that communicate over one or more networks, the method comprising:
acquiring firmware update information, the firmware update information including updated firmware to be applied to a first electronic controller from among the plurality of electronic controllers;
determining, by accessing the one or more memories, whether or not the first electronic controller satisfies a second condition based on second information about the first electronic controller, wherein the second information is whether the first electronic controller includes a firmware cache for performing a pre-update firmware cache operation; and
causing, when the second condition is determined not to be satisfied, the gateway device to execute a proxy process,
wherein the gateway device requests the first electronic controller to transmit boot ROM data to the gateway device, creates updated boot ROM data with the updated firmware, and transmits the updated boot ROM data to the first electronic controller that updates the boot ROM and resets the first electronic controller with the updated firmware, and
at least one of the plurality of electronic controllers is implemented in a virtual machine.

* * * * *